United States Patent
Adir et al.

(10) Patent No.: US 12,149,607 B2
(45) Date of Patent: Nov. 19, 2024

(54) GRAPH BASED EMBEDDING UNDER FULLY HOMOMORPHIC ENCRYPTION

(71) Applicant: International Business Machines Corporation, Armonk, NY (US)

(72) Inventors: Allon Adir, Kiryat Tivon (IL); Ramy Masalha, Kafr Qari (IL); Eyal Kushnir, Kfar Vradim (IL); Omri Soceanu, Haifa (IL); Ehud Aharoni, Kfar Saba (IL); Nir Drucker, Zichron Yaakov (IL); Guy Moshkowich, Nes Ziyona (IL)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 17/962,843

(22) Filed: Oct. 10, 2022

(65) Prior Publication Data
US 2024/0121074 A1   Apr. 11, 2024

(51) Int. Cl.
*H04L 9/00* (2022.01)
*G06F 9/38* (2018.01)
*H04L 9/40* (2022.01)

(52) U.S. Cl.
CPC ............ *H04L 9/008* (2013.01); *G06F 9/3887* (2013.01); *H04L 63/0428* (2013.01)

(58) Field of Classification Search
CPC ..................... H04L 9/008; H04L 63/0428
(Continued)

(56) References Cited

U.S. PATENT DOCUMENTS

2020/0356858 A1   11/2020   Hedge et al.
2021/0216881 A1*   7/2021   McCarthy ............... G06F 18/22
(Continued)

FOREIGN PATENT DOCUMENTS

CN   113420232 A   9/2021
CN   113901500 A   1/2022

OTHER PUBLICATIONS

Cheon, Jung H. et al., "Homomorphic Encryption for Arithmetic of Approximate Numbers", 23rd International Conference on the Theory and Applications of Cryptology and Information Security, Hong Kong, China, Dec. 3-7, 2017, 23 pages.
(Continued)

*Primary Examiner* — Tan Doan
(74) *Attorney, Agent, or Firm* — Stephen J. Walder, Jr.; Anthony Pallone

(57) ABSTRACT

Mechanisms are provided for fully homomorphic encryption enabled graph embedding. An encrypted graph data structure, having encrypted entities and predicates, is received and, for each encrypted entity, a corresponding set of entity ciphertexts is generated based on an initial embedding of entity features. For each encrypted predicate, a corresponding predicate ciphertext is generated based on an initial embedding of predicate features. A machine learning process is iteratively executed, on the sets of entity ciphertexts and the predicate ciphertexts, to update embeddings of the entity features of the encrypted entities and update embeddings of predicate features of the encrypted predicates, to generate a computer model for embedding entities and predicates. A final embedding is output based on the updated embeddings of the entity features and predicate features of the computer model.

20 Claims, 13 Drawing Sheets

(58) Field of Classification Search
USPC .......................................................... 380/20
See application file for complete search history.

(56) References Cited

U.S. PATENT DOCUMENTS

| | | | |
|---|---|---|---|
| 2021/0376995 A1 | 12/2021 | Ratha et al. | |
| 2022/0405474 A1* | 12/2022 | Seo ........................ | G06N 3/044 |
| 2023/0055618 A1* | 2/2023 | Jakobsson .......... | G06Q 20/3674 |
| 2023/0085239 A1* | 3/2023 | Adir .................... | H04L 63/0428 |
| | | | 713/189 |
| 2024/0171375 A1* | 5/2024 | Masalha ............... | H04L 9/0618 |

OTHER PUBLICATIONS

Goyal, Palash et al., "Graph Embedding Techniques, Applications, and Performance: A Survey", arXiv: 1705.02801v4 [cs.SI] Dec. 22, 2017, 19 pages.

Xu, Depeng et al., "DPNE: Differentially Private Network Embedding", Pacific-Asia Conference on Knowledge Discovery and Data Mining, Springer, vol. 10938, Jun. 2018, 12 Pages.

Zhang, Sen et al., "Graph Embedding Matrix Sharing with Differential Privacy", IEEE Access, vol. 7, Jul. 8, 2019, 10 pages.

Zhang,, Kainan et al., "Link-Privacy Preserving Graph Embedding Data Publication with Adversarial Learning", Tsinghua Science and Technology, vol. 27, IEEE, Sep. 29, 2021, 13 pages.

Zhou, Neng et al., "Reversible Data Hiding Scheme in Homomorphic Encrypted Image Based on EC-EG", Applied Sciences, vol. 9, Issue 14; Key Laboratory of Network and Information Security under Chinese People Armed Police Force (PAP), Engineering University of PAP, Xi'an 710086; Jul. 20, 2019, 20 pages.

* cited by examiner

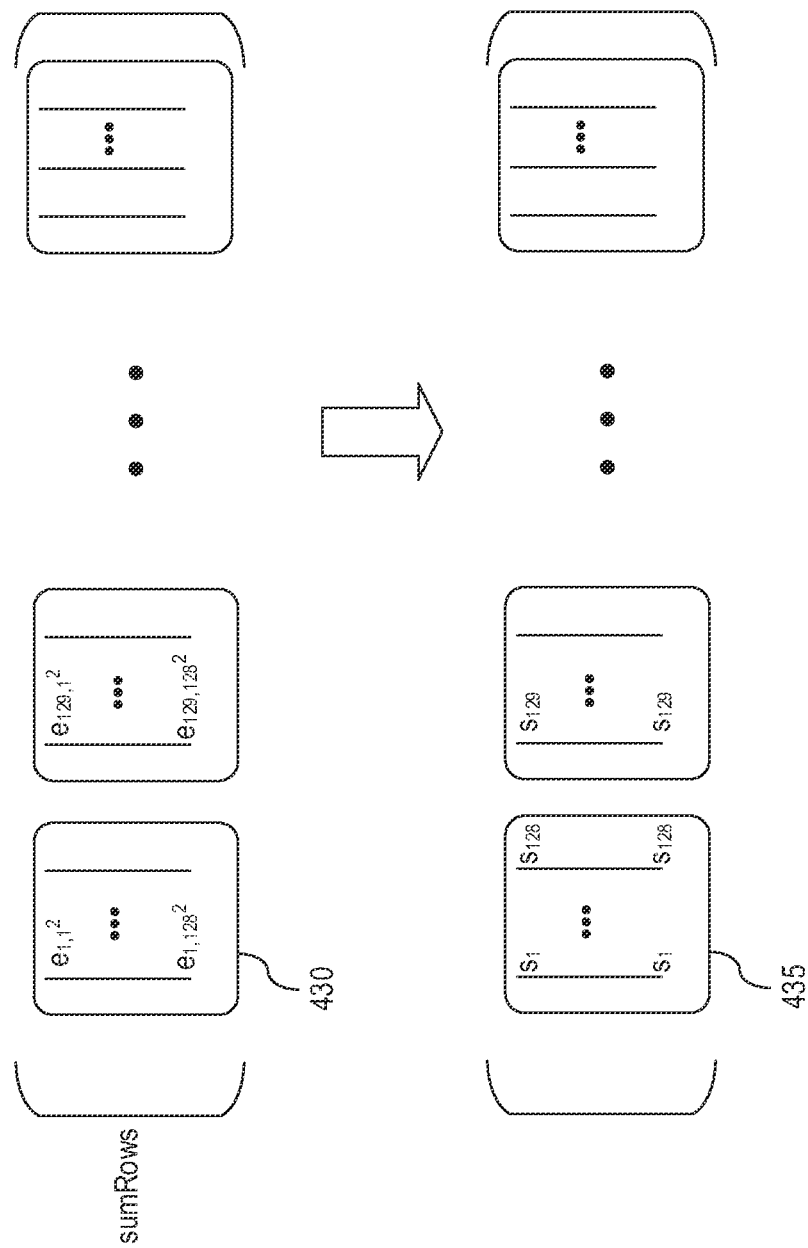

FIG. 6

GRAPH BASED EMBEDDING UNDER FULLY HOMOMORPHIC ENCRYPTION

BACKGROUND

The present application relates generally to an improved data processing apparatus and method and more specifically to an improved computing tool and improved computing tool operations/functionality for performing graph based embedding under fully homomorphic encryption.

Knowledge graphs facilitate relation-concept-representations. By modeling concepts, such as words, entities, ideas, records, or the like, as nodes in a graph, with connections to other nodes representing other concepts, such as other words, entities, ideas, records, or the like, via edges that represent relationships or links between these concepts, one is able to represent complex notions, relationships, and ontologies. Relational learning of supervised machine learning computer models allows these machine learning computer models to draw insights from knowledge graphs, predict connections, and the like.

Graph embedding is a technique in data science and machine learning to transform a graph, such as a knowledge graph, comprised of nodes and edges, and the corresponding features of these nodes and edges, into a lower dimension vector space while preserving properties, such as graph structure, e.g., graph topology, node-to-node (or vertex-to-vertex) relationships, and other relevant information about graphs, subgraphs, and nodes (vertices), as much as possible. Graph embeddings transform a graph structure into a computationally digestible format for use by data science algorithms, machine learning algorithms, and the like, so that these computing tools may be used to understand complex networks of entities and their relationships.

This computationally digestible format comprises vector representations of the features of a graph and/or graph elements, in a lower dimension vector space. By transforming these features into a lower dimension vector space, the graphical representation of entities and relationships is made conducive to mathematical computations, such as distance computations and the like, which facilitates similarity searches and pattern matching computer operations. Such operations may be utilized by machine learning algorithms to learn relationships between patterns and classifications or predictions so that similar patterns may be recognized in graphical representation of datasets, ontologies, and the like, and corresponding classifications or predictions may be generated.

While graph embedding provides a mechanism for translating large datasets and knowledge represented by graph data structures, such as a knowledge graph, into a format that is more computationally efficient, there is not any known mechanism for performing relational learning, such as may be used by various data analytics and machine learning computer models, in a privacy preserving manner while providing accurate analytics and/or machine learning results, and having a computational time and resource utilization that is reasonable given current computing capabilities. Solutions that attempt to provide privacy to data in knowledge graphs used for such relational learning are based on performing a trade-off between privacy and accuracy of the results generated by the data analytics and/or machine learning computer model. However, this trade-off still generates results that are either not sufficiently privacy preserving, or if privacy preserving, do not provide accurate results. Moreover, the high dimensional nature of knowledge graphs results in poor utility value for these solutions as they are not practical with regard to performance, e.g., they are slow or require large computation times and resources, to the point of infeasibility. Thus, there is a need for an improved computing tool and improved computing tool operations/functionality that supports a fully privacy preserving solution which provides accurate results, and does so with reasonable computation times and resource utilization such that they are feasible given computational capabilities.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for fully homomorphic encryption enabled graph embedding. The method comprises receiving an encrypted graph data structure comprising a plurality of encrypted entities and a plurality of encrypted predicates, and generating, for each encrypted entity in the plurality of encrypted entities, a corresponding set of entity ciphertexts based on an initial embedding of entity features of the encrypted entity. The method also comprises generating, for each encrypted predicate in the plurality of encrypted predicates, a corresponding predicate ciphertext based on an initial embedding of predicate features of the encrypted predicate. In addition, the method comprises iteratively executing a machine learning process, on the sets of entity ciphertexts and the predicate ciphertexts to update embeddings of the entity features of the encrypted entities and update embeddings of predicate features of the encrypted predicates, to generate a computer model for embedding entities and predicates. Moreover, the method comprises outputting a final embedding based on the updated embeddings of the entity features and predicate features of the computer model. Thus, with the mechanisms of this illustrative embodiment, embeddings may be generated for entities and predicates of an input graph data structure without exposing private data as the embeddings may be generated in a fully homomorphic operation.

In some optional illustrative embodiments, the iterative execution of the machine learning process comprises iteratively updating the embeddings of the entity features and embeddings of the predicate features based on a minimization of a loss function, wherein the loss function is a function of at least two entity embeddings and a predicate embedding. The minimization of the loss function provides a mechanism by which the embeddings may be incrementally updated to arrive at an optimum embedding, and generating this optimum embedding based on encrypted data which preserves the privacy of the data.

In some optional illustrative embodiments, the set of entity ciphertexts and the predicate ciphertext are packed into a single packed ciphertext, where the iterative execution of the machine learning process is performed on the single packed ciphertext. By packing the ciphertexts into a single packed ciphertext, the learning of the embeddings is made faster and more feasible given limited computer resources. For example, in some optional illustrative embodiments, the iterative execution of the machine learning process comprises executing single instruction multiple data (SIMD) computer operations on the single packed ciphertext at approximately a same time for a plurality of entities and predicates, such that the computation resources and computation time needed to generate the final embeddings is minimized.

In some optional illustrative embodiments, the set of entity ciphertexts comprises matrices in which each column corresponds to an entity, and each row corresponds to a feature of the entities. In some optional illustrative embodiments, the set of entity ciphertexts comprises a plurality of first ciphertexts that comprise embeddings of features of corresponding entities, and an indicator ciphertext specifying a first value in elements of a column corresponding to an entity in the plurality of entities for which the set of entity ciphertexts corresponds, and a second value in all other elements of all other columns. These ciphertexts permit fully homomorphic encrypted operations to be performed such that private data is not exposed, yet embeddings may be learned through a machine learning process.

In some optional illustrative embodiments, a machine learning computer model is trained on the final embedding as input to the machine learning computer model, to predict a probability that a relationship exists between at least two entities in the encrypted graph data structure. In this way, new relationships that may not have been explicitly represented in the known facts set forth in the input graph data structure may be discovered based on the embeddings generated for the entities and predicates in the input graph data structure. This may be done without exposing the private data itself.

In some optional illustrative embodiments, the encrypted graph data structure is received from a client computing device via at least one data network, and the data processing system comprises at least one server computing device providing a cloud service that performs the operations of generating the corresponding set of entity ciphertexts, generating the corresponding predicate ciphertexts, iteratively executing the machine learning process, and outputting the final embedding. In this way, the private data of the client computing device is not exposed outside the client computing device and is not provided to the cloud service in an unencrypted format. The cloud service operates on the encrypted data in a fully homomorphic operation such that embeddings may be learned and used to generate predictions for relationships between entities, without having access to private data of the client computing device.

In some optional illustrative embodiments, outputting the final embedding comprises generating an encrypted embedded graph data structure based on the final embedding, and outputting the encrypted embedded graph data structure to a source computing device from which the encrypted graph data structure was received. Thus, a final embedding for the entities and predicates in the encrypted graph data structure may be provided to the source computing device so that these embeddings may be used to specify entities and relationships for performance of operations, such as submitting requests for verification of relationships between entities in a graph data structure.

In some optional illustrative embodiments, the method further comprises receiving a request to verify a relationship between at least two entities of the encrypted graph data structure, wherein the request comprises an encrypted tuple specifying a first entity, a second entity, and the relationship to be verified, generating a measure of veracity of the encrypted tuple based on the final embedding and a distance function, and returning an output to an originator of the request specifying the measure of veracity of the encrypted tuple. Thus, new relationships between entities may be evaluated and probabilities that these relationships represent true relationships between entities that exist may be generated. In some illustrative embodiments, based on these measures of veracity, the encrypted graph data structure may be updated, such as when the measure of veracity meeting or exceeding a predetermined threshold. In this way, the graph data structure may be expanded to include knowledge that was not previously explicitly represented as relationships in the original graph data structure.

In other optional illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another optional illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4C shows an example operation for summing over the rows with the result being duplicated over the rows in accordance with one illustrative embodiment;

FIG. 6 is an example diagram illustrating tail entity and head entity ciphertext packings in accordance with one illustrative embodiment for facilitating parallel execution of an instruction on a plurality of entities and predicates at substantially a same time;

DETAILED DESCRIPTION

Figure 1:
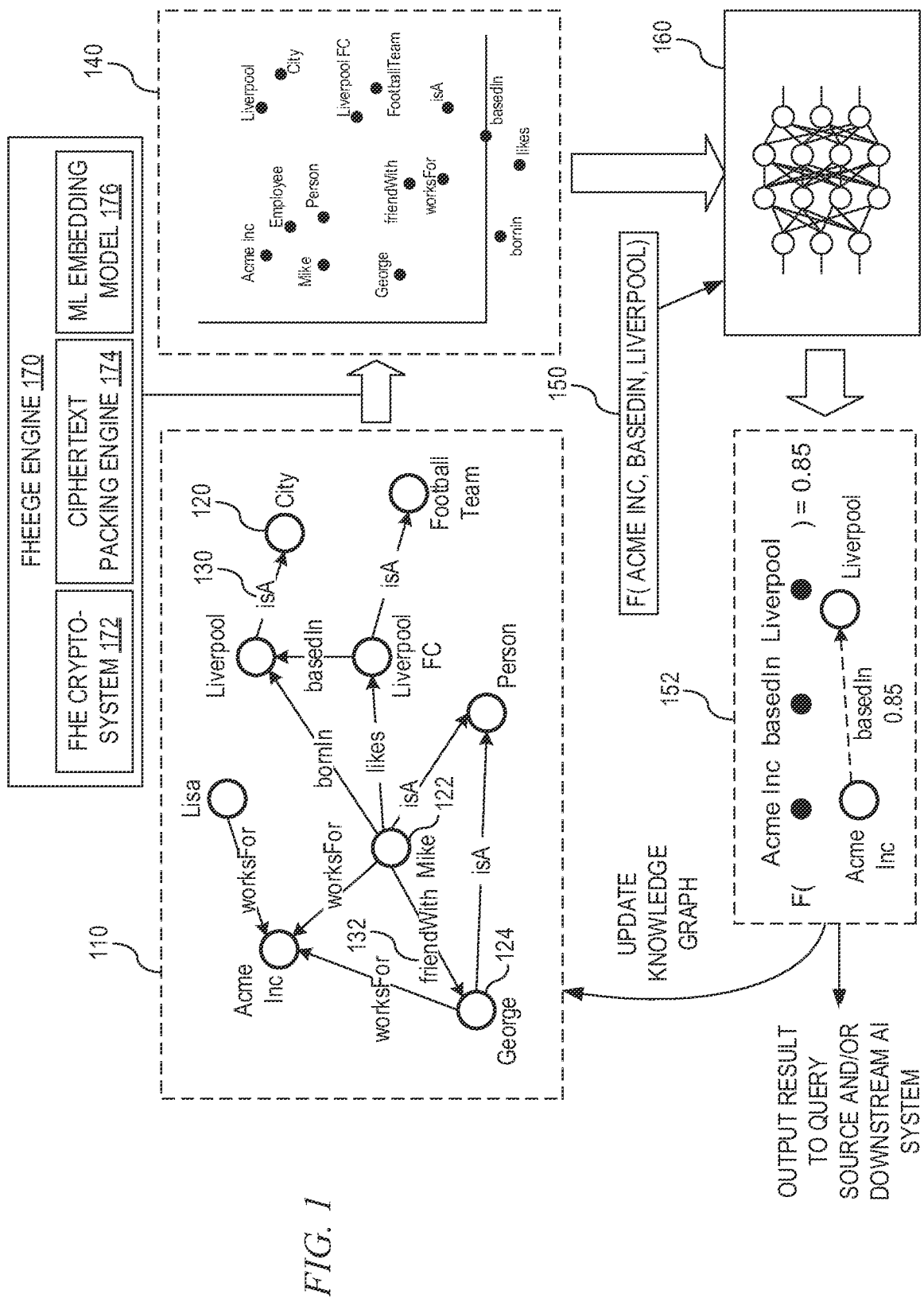
FIG. 1 is an example diagram illustrating a graph embedding operation in which nodes and edges of an input knowledge graph are translated into a lower dimension vector space in accordance with one illustrative embodiment.

Fully homomorphic encryption (FHE) is an encryption scheme that enables analytical functions to be run directly on encrypted data while yielding results from the encrypted data that are the same as if the analytical functions were executed on the unencrypted data, also referred to as the plaintext. Such encryption schemes are attractive in cloud-based computing environments as it allows data providers to encrypt their data, and thereby maintain the privacy or secrecy of the data, before providing the encrypted data to cloud services that execute analytical functions on the encrypted data, train machine learning computer models using the encrypted data as training and testing datasets, execute machine learning computer models on the encrypted data, or the like, generate results that are returned to the data providers. This allows data providers to leverage the computational capabilities and services of cloud-based computing environments without exposing their private data to other parties.

For example, a data provider, e.g., a hospital, medical insurance company, financial institution, government agency, or the like, may maintain a database of data comprising private data about patients that the data provider does not want exposed outside of its own computing environment. However, the data provider, for various reasons, wishes to utilize the analytical capabilities, machine learning computer models, or the like, of one or more cloud-based computing systems to perform analytical functions, artificial intelligence operations, such as generating insights from classifications/predictions performed by trained machine learning computer models, or the like, on the private data. For example, if the data provider is a hospital and wishes to perform analytics on its patient data, the hospital would like to send the patient data to the cloud-based computing systems for performance of these analytics, which may use specially trained machine learning algorithms and the like. However, the hospital does not want to expose the personally identifiable information (PII) of the patients, e.g., names, addresses, social security numbers, or other types of information that alone or in combination can uniquely identify an individual, as such exposure would not only open the hospital to legal liability, but may also be in violation of established laws of the jurisdiction(s) in which the hospital operates. As a result, using FHE, the hospital may encrypt the data prior to sending the encrypted data to the cloud-based computing system for performance of the analytics functions. The analytics are executed on the encrypted data and the encrypted results are returned. The data provider then unencrypts the encrypted results and obtains the unencrypted results for use by the hospital. At no time in this process does the cloud-based computing system gain access to the unencrypted data and thus, privacy is preserved.

FHE allows such analytical functions to be performed on private data without divulging the private data itself, and without the need for trusted third parties or intermediaries, and without having to mask or drop features in order to preserve privacy of the data, e.g., through replacement of PII with generic privacy preserving representations of the PII, or other modifications or replacements of private data. While FHE provides a solution for maintaining privacy of data, existing FHE solutions, such as the open source Homomorphic Encryption for Arithmetic of Approximate Numbers (HEAAN), Microsoft SEAL library, and the like, are not feasible as they have slow computation speed and accuracy issues which do not lend themselves to computationally heavy applications. Thus, FHE suffers from similar drawbacks as discussed above with regard to other solutions that attempt to provide data privacy by performing trade-offs between privacy and accuracy in that they are not feasible due to computation time and resource utilization.

The illustrative embodiments provide an improved computing tool and improved computing tool operations/functionality to provide fully homomorphic encryption (FHE) enabled graph embedding (GE), also referred to herein as "FHEEGE", that maintains the privacy of the features, e.g., labels and other features, of the entities and predicates (relationships or links), of the data of an input knowledge graph or other graph data structure, while achieving accurate results and doing so with reasonable computation time and computation resource utilization. The FHEEGE engine of the illustrative embodiments permits further functions to be performed, such as expanding the knowledge graph with relations that do not appear in the original knowledge graph, yet are determined to be sufficiently supported as being present, evaluating queries as to relations not present in the knowledge graph, such as predicting a likelihood that two entities have a relation specified in the query, or the like. These operations may serve as a basis for further operations, such as performing machine learning model based classification, prediction, or the like, training such machine learning models based on the knowledge graph, or expanded knowledge graph, and the like.

The present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides fully homomorphic encryption enabled graph embedding computer functionality. The improved computing tool implements mechanism and functionality, such as the FHEEGE engine and its corresponding operations, which cannot be practically performed by human beings either outside of, or with the assistance of, a technical environment, such as a mental process or the like. The improved computing tool provides a practical application of the methodology at least in that the improved computing tool is able to feasibly generate graph embeddings while maintaining the privacy of data in an input knowledge graph, through the particular ciphertext representations of entities and predicates of the input encrypted knowledge graph, ontology, or other graph data structure, as described hereafter.

In one illustrative embodiment, the FHEEGE engine, or computing tool, receives an input graph data structure, such as a knowledge graph, ontology data structure, or the like, used to train a machine learning computer model, where relationships between entities are specified as a tuple data structure comprising a head entity (h), a tail entity (t), and a predicate (l) (also referred to as a relationship/link) with the entities h and t. The head entity h is a first entity in the knowledge graph which has a relationship with the tail entity t specified by the predicate l, which may be a directed edge from the head entity h to the tail entity t. For example, a knowledge graph input to the FHEEGE engine of this illustrative embodiment may comprise a plurality of relationships between head entities and tail entities that are represented as the tuple (h, l, t) in the knowledge graph data structure (hereafter referred to simply as the "knowledge graph") or otherwise extracted from the knowledge graph. That is, in some illustrative embodiments, these relationships may be extracted from the input knowledge graph by parsing the graph data structure and, for each edge in the graph data structure, representing the edge as the corresponding tuple (h, l, t) with the nodes connected by the edge being the head and tail entities h and t, and the edge being the predicate l.

Thus, the input knowledge graph may be used to represent a collection of known facts via labeled directed edges from the head entity to the tail entity, where the label(s) of the edge may specify the type of relationship and possibly other characteristics of the predicate l. Each node in the knowledge graph represents an entity, or concept, and a labeled directed edge from one node to another represents the fact that the pair of nodes satisfies a relation or predicate with the relation name being the label. The knowledge graph may have many different labels or relations represented in the knowledge graph. A fact in the knowledge graph may be represented as the tuple of the form (h, l, t) or l(h, t), or the like, where h and t are the nodes representing the head entity and the tail entity, and l is the relationship or link labeling a directed edge from h to t, as previously stated above. As an example. Consider a tuple (P, capital_of, Q) where P may be an entity of type "city" and Q may be of a type "country", a "state", a "territory", or the like, and "capital_of" is the relationship or link between the city and the country, state, territory, or the like. Thus, for example, P may be "Austin" and Q may be "Texas", with the value of the predicate "capital_of" being a 1 indicating that the relationship, or fact represented by the tuple, is true. In a tuple of "Austin", "capital_of", "Virginia", the value of the predicate "capital_of" may be 0 indicating that the fact represented by the tuple is not true.

The FHEEGE engine receives as input the entities, predicates and tuples of the input knowledge graph, which may include private data, such as personally identifiable information (PII) or other sensitive data about the entities and relationships that, for privacy preserving reasons, should not be disclosed to or otherwise accessible by unauthorized parties. In order to maintain the privacy of such sensitive data, the FHEEGE engine of the illustrative embodiments randomly initializes the initial embeddings of the entities and the predicates, where an embedding is a string of numerical values, e.g., a vector of feature values, where there is a separate vector for each node and edge, that is used as a unique identifier and which can be manipulated and operated on by computing tools to perform computing operations. These initial embeddings are then encoded and encrypted with one or more FHE crypto-systems and packed, in accordance with the illustrative embodiments, into ciphertext data structures (referred to simply as ciphertexts hereafter), as will be described in greater detail hereafter. This is done for both entities and the relationships/predicates (hereafter referred to as "predicates"). That is, for each of the entities in the input knowledge graph or portion of the input knowledge graph, the packing of the encoded and encrypted features of each entity is performed with regard to a plurality of generated ciphertexts. Each ciphertext encrypts a portion of the plurality of entities, where the portion corresponds to a batch size for the machine learning training of a machine learning computer model that performs the FHEEGE embedding optimization, and where each entity has a plurality of features, e.g., each row of a ciphertext may correspond to an entity feature of the entities, and each column may correspond to a particular entity in the portion of the plurality of entities, such that an intersection of a row/column is a value representing an encoded and embedded value for the corresponding feature of the corresponding entity. For example, each entity in the knowledge graph, or portion of the knowledge graph, may be represented as a set of 8 ciphertexts, each ciphertext corresponding to a portion of entities, and their features, in the knowledge graph, e.g., 128 entities each having 128 features, resulting in a total of 1024 entities each having 128 features. The predicate embeddings, for each predicate, are similarly encoded, encrypted and packed into a single ciphertext in which each predicate is represented as a column in the ciphertext, and each row corresponds to a feature of the predicates. In packing the entities and predicates into their corresponding ciphertexts, indicator matrices may be used to represent the particular entities and predicates, as will be described in greater detail hereafter.

Having generated the ciphertexts representing the entities and predicates in an encoded, encrypted, and packed manner based on an initial random embedding, in order to find a "best" embedding for the entities and predicates of the knowledge graph input, i.e., find the best assignment of a vector of feature values for each node and edge, a search of the embedding space is performed for each embedding, where the search seeks to bring a loss-function to a minimum, and where the loss function gives a numeric score to every possible embedding in the embedding space, where a low score is more desirable, i.e., there is less error or loss. In some illustrative embodiments, the search is performed using a stochastic-gradient-descent (SGD) algorithm that starts with the random embedding noted above, i.e., a random assignment of vector feature values for each node/edge in the input knowledge graph, or portion of the input knowledge graph upon which the operations are being performed. The search then determines the slope of the loss function that would give a lower level of loss and a small step in the vector feature values is performed in a direction of the slope. That is, the loss derivative of the embeddings is homomorphically computed, i.e., the computation is performed on ciphertexts rather than the plaintext, by the FHEEGE engine. The loss derivative is computed from all the features in all the vectors assigned to all the nodes/edges in the knowledge graph input, or portion of the knowledge graph input operated on, and this loss derivative is subtracted from the current embeddings. This operation in effect makes a small step in the direction of the slope of the loss function. It should be appreciated that this operation is being performed with regard to the encoded, encrypted, and packed embeddings, where the packing of the encoded and encrypted embeddings into the ciphertexts allows for single instruction multiple data (SIMD) processing of the ciphertexts which greatly improves computing time and computing resource utilization.

As an example of the search performed to determine the best embedding of the entities/predicates in the input (portion of) knowledge graph, if the initial encoded and encrypted embedding for a given node (entity) of the knowledge graph is the vector <10, 20, −60, 50> and the loss derivative at this point is <1, −2, 1, 0>, then a small step is taken in the direction of this derivative, and the next step is computed as the function <10, 20, −60, 50>+step*<1, −2, 1, 0>. It should be noted that, in practice there may be hundred or even thousands of features, not just 4 as in this simplified example. If the step size is 0.01 then making this step would get result in a new vector embedding of <10.01, 19.08, −59.99, 50> which has a better score according to the loss function. As discussed hereafter, this is done at once, using SIMD processing capabilities, for all the embeddings of the nodes/edges based on the packed ciphertexts.

This process is repeated for a predetermined number of epochs or until a convergence criterion is achieved, e.g., 1000 epochs or iterations. Thus, for example, many such "steps" are made until the scores generated by the loss function are satisfactory, which may occur after a predetermined number of epochs, or the loss is below a given threshold. In some illustrative embodiments, because the loss function may not be able to be checked due to it being encrypted, the convergence criteria or stopping criteria may be a large enough number of epochs or iterations that is determined to most likely result in an acceptable loss, as determined through heuristic approaches. It should be appreciated that while the illustrative embodiments utilize a Stochastic-Gradient-Descent (SGD) algorithm for determining the best embeddings for the nodes and edges based on the encoded and encrypted embeddings, the illustrative embodiments are not limited to SGD and other algorithms that are currently known or later developed may be used without departing from the spirit and scope of the present invention.

The resulting embeddings accurately and uniquely represent each entity (node) and predicate (edge) as a corresponding encoded and encrypted embedding. The embeddings may then be used as input to a machine learning computer model to train the computer model to predict relationships between entities or evaluate predicate based queries, for example. The machine learning computer model is trained to recognize relationship patterns represented in the encoded and encrypted embeddings as indicative of particular classifications or prediction results. Such recognition may comprise generating distance measures and comparing the distance measures to one or more predetermined thresholds do determine if an input relationship between a head entity and a tail entity is a true relationship.

For example, assume that a data owner has a tuple (h', l', t'), and the data owner wants to check whether the relation (h', l', t') is true based on the knowledge graph data structure. This tuple, may refer, for example, to the key words ("Acme Inc", "Based_in", "Liverpool"). The data-owner sends this tuple (encrypted using indicator matrices) to the FHEEGE system of the illustrative embodiments. Upon receiving the tuple, the server extracts the (previously computed) embeddings of h', l' and t', based on the training of the machine learning computer model, and computes the (encrypted) distance between embedding(t') and embedding(h')+embedding(l'). The FHEEGE system, may then send this distance to the data-owner, who decides that this tuple represents a true relation if the distance is below a certain threshold, or this determination may be made at the FHEEGE system based on pre-established distance thresholds. If this relationship is not explicitly present in the knowledge graph data structure, then the knowledge graph data structure may be updated to explicitly include this relationship, in some illustrative embodiments.

It is important to note that, in this process of the illustrative embodiments, the private data is not divulged to any unauthorized party, as the generation of the embeddings and the training of the machine learning computer models is performed with regard to encoded and encrypted embeddings using one or more FHE crypt-systems, and the particular ciphertext packing described herein. The use of the FHE crypto-system(s) to perform graph embeddings allows the graph topology and private features of the entities and relationships/predicates to be hidden. The use of indicator matrices, as described herein, makes it possible to process entities that cannot be seen, i.e., entities that are encrypted. For example, assume there is a tuple (10, 12, 15) and there are 128 entities and 128 predicates in total. The FHEEGE system receives three indicator matrices h, l, t with 128 (encrypted) columns each. In h, the 10th column contains is while all other columns contain 0s. Similarly, in l, the 12th column contains 1s and all other column 0s. In t, the 15th column is 1s while all other columns are 0. The FHEEGE system receives these indicator matrices encrypted, so it cannot see which of the columns contain 1s or 0s. However, the FHEEGE system can multiply these indicator matrices with the embedding matrices from the last iteration, to get the embeddings of the 10th and 15th entities and the 12th label. Thus, the FHEEGE system extracts the 10th, 12th and 15th columns, without seeing the values 10, 12 and 15.

In addition to these improvements over prior graph embedding solutions, the packing of data into ciphertexts in accordance with the illustrative embodiments enables blind computation of the entity and predicate embeddings. The packing of data into ciphertexts further allows for the utilization of SIMD processing in the FHEEGE engine, which makes the computation time and resource utilization reasonable and feasible given existing computer processing capabilities.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 is an example diagram illustrating a graph embedding operation in which nodes and edges of an input knowledge graph are translated into a lower dimension vector space in accordance with one illustrative embodiment. As shown in FIG. 1, a graph data structure, such as a knowledge graph 110, is comprised of nodes 120 and edges between nodes 130 that represent relationships or predicates of the entities represented by the nodes 120. For example, the node 122 for the entity "Mike" has an edge 132 showing a relationship or predicate of type "friendWith" connecting to the node 124 for the entity "George". This representation indicates that Mike is friends with George. The head entity in this case is Mike and the tail entity is George, as the edge relationship goes from Mike to George (note the direction of the arrow in the knowledge graph 110). This relationship may be represented as a tuple data structure of the type (h, l, t), or in this particular example, (Mike, friendsWith, George), where the value of "friendsWith" will be 1 or true if Mike is friends with George, and 0 or false if Mike is not friends with George. In some cases, a binary relationship or predicate value may not be used and instead a probability or other value may be utilized to represent a level of confidence in the relationship or predicate being true.

As shown in FIG. 1, the entities and predicates of the knowledge graph 110 may be translated into a lower dimension vector space 140. Each of the points in the vector space 140 represents a multi-dimensional vector representation of the corresponding entity or predicate, only 2 dimensions being represented in the figure for ease of depiction. The dimensions may correspond to features of the corresponding entity or predicate. These vector representations are an embedding of the entities and predicates from the knowledge graph 110 and thus, are referred to as a graph embedding. These vector representations of the entities and predicates provide a more efficient representation for purposes of performing computations and processing of the graph data structure for the knowledge graph 110.

For example, the graph embeddings of the entities and predicates in the vector space 140 may be used to train a machine learning computer model 160 to classify/predict relationships between entities, e.g., predict new predicates for given entities, or to check whether a given query relation is true. The training of the machine learning computer model 160 may receive the inputs of embeddings for the various entities and predicates in a knowledge graph and may be trained on a training set of queries. The machine learning computer model 160 may perform a classification/prediction operation on the query and the result may be compared to a ground truth to generate a loss. The machine learning computer model 160 training then adjusts operational parameters of the machine learning computer model 160 to attempt to minimize that loss, e.g., changing weights of nodes in the layers of the machine learning model, e.g., a deep learning neural network, convolutional neural network, or the like. Once trained, the trained machine learning model 160 may be applied to new queries and/or new knowledge graphs to generate classifications and/or predictions based on the training.

For example, a query 150 may be of the type f(Acme Inc, basedIn, Liverpool) and the value for this relationship may be a confidence or probability that this relationship in this query is true or not, e.g., through trained machine learning computer model processing of the query, it can be determined that there is a confidence or probability that the predicate "basedIn" is true for this relationship is 0.85 or 85% likelihood. It should be noted that the relationship (Acme Inc. basedIn, Liverpool) does not exist in the input knowledge graph 110, i.e., there is no edge between Acme Inc. and Liverpool that has a type of "basedIn", and thus, this query is investigating the likelihood of this relationship existing between these entities given the knowledge represented in the knowledge graph 110. This confidence or probability value may be generated by the trained machine learning computer model 160 based on its training to recognize patterns in input data indicative of particular relationships, e.g., if Liverpool is "locatedIn" England, and Acme Inc. "pays taxes" in England, then there is a higher likelihood that Acme Inc. is "basedIn" Liverpool, and if Acme Inc. "ships from" England, there is a higher likelihood that Acme Inc. is "basedIn" Liverpool.

Each of these known relationships that are represented in the input knowledge graph 110 may be evaluated by the trained machine learning computer model 160 to generate a confidence or probability in the queried relationship 150 being true. Based on the evaluated confidence or probability generated by the trained machine learning computer model 160 processing of the query on a given knowledge graph 110 and its embeddings 140, responses to the query 150 may be generated, e.g., generating an output indicating the confidence/probability of the queried relationship being true, which can serve as a basis for further operations, such as updating the knowledge graph data structure to represent the relationship as an actual edge 152 in the knowledge graph data structure 110, and embedded into the embedding vector space 140, between the specified entities and having the corresponding queried relationship type "basedIn". Other types of subsequent artificial intelligence operations may also, or alternatively, performed, such as various types of classification and/or prediction operations.

While there are various graph embedding techniques generally known in the art, the illustrative embodiments provide a specific improvement to the graph embedding computer functionality by providing a fully homomorphic encryption (FHE) enabled graph embedding (GE) computing tool 170 and computing tool functionality not previously known in graph embedding. The FHE enabled GE, or FHEEGE, computing tool 170 and functionality allows for embedding operations and machine learning training of machine learning (ML) computer models, such as ML computer model 160, to be performed without exposing private data from the input knowledge graph 110, and while providing accurate results and a reasonable processing time and computer resource utilization.

To further explain the operation of example illustrative embodiments of the FHEEGE engine 170, consider relationships in a given knowledge graph (or simply "graph") data structure to be represented by a tuple (h, l, t)∈graph, where this is a tuple specifying two entities h and t, (h being the "head" entity and t being the "tail" entity) and a predicate l. Let (h, l, t') be a tuple for a relationship between the same head entity h and a new tail entity t' that is not in the input knowledge graph, i.e., while the entities h and t' may be represented as nodes in the knowledge graph, an edge of the type 1 is not present between these two entities. For example, using the knowledge graph example 110 shown in FIG. 1, a first tuple may be (Mike, friendsWith, George) whereas the tuple that is not present in the knowledge graph 110 may be (Mike, friendsWith, Lisa), where Lisa is the new tail entity t'. The tuple corresponding to a relationship not present in the input graph data structure, or knowledge graph 110 as an example, is referred to as a "corrupted" tuple. The loss formula for the tuple and corrupted tuple may be of the form:

$$RELU(\lambda, + SE(h+l-t)^2) - SE((h+l-t')^2) \qquad (1)$$

where RELU=max(x,0), SE(vector) is the sum of the vector elements, t'−t and h+l are element-wise operations over the embedding vectors of the respective entities/predicate, and $\lambda$ is the margin which is a parameter that controls the shape of the loss curve, where relatively higher values of $\lambda$ extend the range in which an example receives low loss. This loss function may be optimized to minimize the number of multiplications and rotations required to calculate the loss function by way of computer operations as follows:

$$RELU(\lambda + SE((h+l-t)^2) - SE((h+l-t')^2)) = RELU(\lambda + 2SE((t'-t)(h+l))) \quad (2)$$

It should be noted that this loss expression is more efficient to compute over FHE than the original expression (1) above which includes two SE computations instead of just one in the final version of expression (2). SE computations are relatively expensive to compute under FHE because they require ~log(128)=7 rotations.

With this loss formulation in mind, the illustrative embodiments may generate graph embeddings for the entities and predicates by processing the tuples via the FHE crypto-system 172, ciphertext packing engine 174, and ML embedding computer model 176 of the FHEEGE engine 170. The FHE crypto-system 172 performs operations for encoding and encrypting entities and predicates into a vector representation, or embedding, in a vector (or embedding) space, such as 140 in FIG. 1, based on features of the entities and predicates. The ciphertext packing engine 174 generates the embeddings as sets of ciphertexts, e.g., each set comprising 8 ciphertexts which may include 1 indicator ciphertext and 7 other ciphertexts that represent the other entities and their features. For example, in one illustrative embodiment, there may be 8 ciphertexts comprising the embeddings, and 8*128 ciphertexts comprising the total number of ciphertexts across the 128 entities of a batch, for approximately 2K ciphertexts with the indicator matrices. The ML embedding computer model 176 is trained to generate optimized embeddings for the entities and predicates based on a machine learning training using a training dataset of training knowledge graph(s), and then after being trained is used to predict new relations between existing embeddings of entities. The FHE crypt-system 172, ciphertext packing engine 174, and ML embedding computer model 176 operate in conjunction with each other to perform the operations described herein.

For example, in some illustrative embodiments, the FHE crypto-system 172 may operate to initialize the embeddings with randomly chosen embeddings of the entities and predicates. On each iteration of the FHEEGE engine 170 operation, a set of tuples $\{(h_i, l_i, t_i)\}$ is sampled from the tuples of the input knowledge graph, e.g., knowledge graph 110. For each tuple i, the FHE crypto-system 172 changes, or "corrupts", either the head entity h or the tail entity t to generate a new tuple that does not already exist in the input knowledge graph 110, e.g., h is changed to h' or t is changed to t' to generate a corresponding tuple $(h_i', l_i, t_i')$ where $h_i'=h_i$ or $t_i'=t_i$, but not both. After having changed the tuples, in accordance with some illustrative embodiments, the corresponding embeddings for the head, tail, and predicate are updated with respect to the loss formula:)

$$\Sigma(Relu(\gamma + d(h+l, t) - d(h'+l, t'))) \quad (3)$$

where d( ) are the dependent losses, and again $h_i'=h_i$ or $t_i'=t_i$, but not both.

In updating the embedding, the ciphertext packing engine 174 packs each of the embeddings for h, t, l, and either h' or t', depending on which was changed, into sets of ciphertexts which are then used to compute the loss function above and update the corresponding embeddings using the ML computer model 176. The arithmetic operations of the loss function above may then be performed by the ML computer model 176 using the ciphertext representations for each of the entities and predicates and the embeddings may then be updated based on the loss derivatives. That is, for example, the indicator matrices corresponding to $h_i$, $l_i$ and $t_i$ are used to extract their current embeddings and the loss formula of this tuple is computed using the operations supported by the FHE scheme (i.e., additions, multiplications and rotations). A polynomial approximation for ReLU may be used to compute the ReLU activation (for example, one may use the Remez polynomial approximation technique). Further details of these operations being performed, with regard to ciphertext representations of the illustrative embodiments, will be provided hereafter.

Because the entities and predicate are represented as packed ciphertexts in accordance with the illustrative embodiments, the evaluation and updating of the embeddings using the loss function above can be performed taking into account multiple entities and predicates at once using SIMD processing and parallel processing. For example, all of the FHEEGE engine 170 computations may be carried out on whole vectors of values rather than on single values, e.g., when the FHEEGE engine 170 multiplies two ciphertexts, it is in fact multiplying the elements of two vectors element-wise, i.e., every element is multiplied with the corresponding element of the other vector. The packing of the vector representations (embeddings) of entities and predicates into ciphertext representations of the illustrative embodiments allows for many vector computation operations to be performed in parallel at substantially the same time using the SIMD capability of SIMD processors, such that the SIMD capabilities may be exploited in a novel manner in order to make performance of the graph embedding solution practical.

The result of the operation of the FHEEGE engine 170 is an accurate graph embedding for each of the entities and predicates in the input knowledge graph 110, such as embeddings in the embedding space 140 in FIG. 1. These embeddings may then be used to train a machine learning computer model 160 to perform operations on the embeddings and generate corresponding results, which may in fact be used to update the input knowledge graph 110, in some illustrative embodiments, to include relationships, or tuples, between entities that were not previously present in the knowledge graph 110, to answer queries regarding relationships in the input knowledge graph or relationships that are not present in the input knowledge graph, or perform other complex downstream artificial intelligence (AI) computing operations, such as classifications, predictions, or the like.

To explain the operation of the FHEEGE engine 170 in greater detail, with regard to one illustrative embodiment, consider the following example implementation. In the following description of one illustrative embodiment, certain dimensions of data structures are assumed for ease of explanation. It should be appreciated that the following is only an example and is not intended to be limiting on the illustrative embodiments. For example, other dimensions of graph data structures, e.g., number of entities, numbers of predicates, number of tuples, as well as other dimensions of ciphertexts, and the like, may be utilized without departing from the spirit and scope of the present invention. For example, if more entities and predicates are included in the input knowledge graph, a greater number of ciphertexts may be required to encode and encrypt the features of the entities.

For purposes of illustration, it is assumed that an input knowledge graph, such as knowledge graph 110 in FIG. 1, for this example includes K=1024 entities, 128 predicates, and approximately 128,000 tuples having the form of triplets (h, l, t). Each entity and predicate has 128 features that are embedded and that need to be learned by a machine learning computer model, e.g., ML computer model 176, that is used to perform the FHEEGE engine 170 embedding. The learning, in this illustrative embodiment, utilizes stochastic-gradient-descent (SGD) with a batch size of 128 samples that are taken randomly or pseudo-randomly from the 128,000 tuples or triplets (h, l, t). The SGD learning-rate for this machine learning computer model is referred to as learning rate (LR), and the margin of the loss function for the machine learning computer model is $\lambda$.

The machine learning computer model 176 uses a configuration where ciphertexts and plaintexts include approximately 16K slots (128×128=16,384), and a FHE cryptosystem 172 supports single-instruction-multiple-data (SIMD) operations, i.e., element-wise operations like addition and products between such ciphertexts and plaintexts, and also supports rotations. Examples of FHE crypto-systems 172 that may be utilized include the open source Homomorphic Encryption for Arithmetic of Approximate Numbers (HEAAN) library, Microsoft SEAL library, or the like. For example, Microsoft SEAL is a homomorphic encryption library that allows additions and multiplications to be performed on encrypted integers or real numbers, while other operations, such as encrypted comparison, sorting, or regular expressions, are generally not feasible to evaluate on encrypted data using Microsoft SEAL. While these FHE mechanisms may operate on encrypted values, they have not been previously adapted for performing operations of graph embeddings, as in the present invention.

The mechanisms of a FHEEGE engine, in accordance with some illustrative embodiments utilize a data representation in which entity embeddings structures are in the form of a plurality of ciphertexts, e.g., 8 ciphertexts of approximately 16K (128×128=16,384) slots each. These ciphertexts may be represented as tensors for machine learning purposes. The batch size operated on from the input knowledge graph 110 comprises K entities, e.g., K=1024, each with N features, e.g., N=128 features. Each ciphertext in these example illustrative embodiments encrypts a portion of the K entities, e.g., 128 entities, such that each ciphertext is viewed as a 128×128 tensor in which every column encrypts a separate entity with its corresponding 128 features, the features being represented by the rows.

Figure 2:
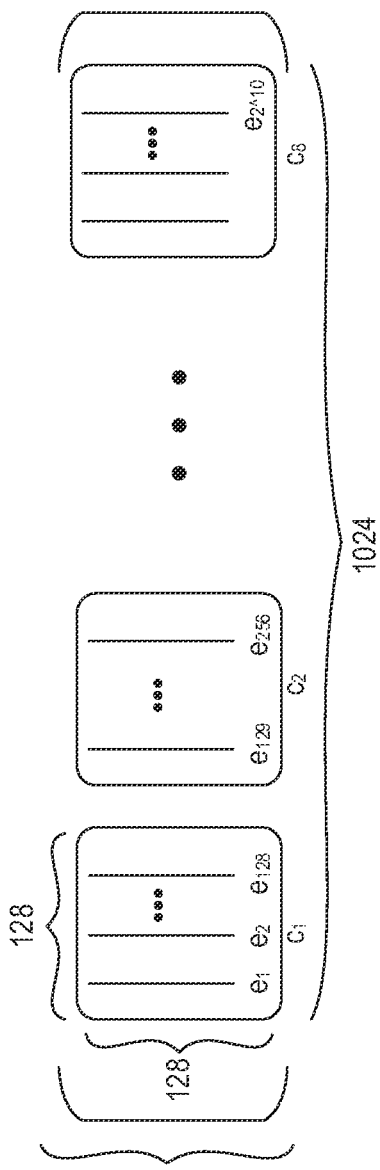
FIG. 2 is an example diagram illustrating a ciphertext representation of entities in accordance with one illustrative embodiment.

FIG. 2 demonstrates an example of this data representation in which c1 . . . c8 are the 8 ciphertexts for representing an entity, and each ciphertext encrypts the 128 features (rows) of 128 entities (columns). Thus, for example, ciphertext c1 encrypts the 128 features of entities e1 through e128, ciphertext c2 encrypts the 128 features of entities e1 through e128. For example, the first feature of each entity may be provided in the first row of ciphertext c1 as features {e1_1, e2_1, . . . e128_1} with similar features being provided in the ciphertext c1 for the other 127 features in subsequent rows. Thus, each ciphertext comprises 128 rows corresponding to entity features and 128 columns corresponding to each entity. For example, ciphertext c2 encrypts the features of entities e129 through e256, ciphertext c3 encrypts the features of entities e257 through e511, etc. with ciphertext c8 encrypting features of entities e896 through e1024. This representation may be prepared, for example, by first packing the initial embeddings of the 128 entities using ciphertext packing engine 172 and then encrypting the values using FHE crypto system 174.

In accordance with some illustrative embodiments, there are 128 predicates, each predicate having 128 features. The predicate embeddings structure, in accordance with some illustrative embodiments, is in the form of a single ciphertext of 16K slots, such that each predicate is encrypted into one column of this ciphertext when viewed as a tensor of size 128×128. It should be appreciated that the "features" of the entities and predicates are the embedding values. For example, if the embeddings are points in a $R^{128}$ space, then the 128 values of each embedding are called the features. They may be initialized to random values and then computed using SGD which minimizes the loss formula.

Figure 3:
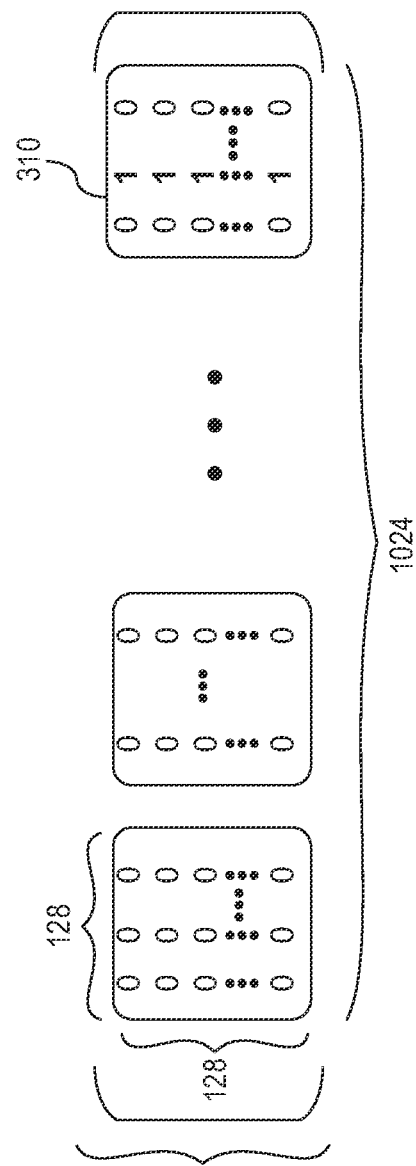
FIG. 3 is an example diagram of an indicator ciphertext representation in accordance with one illustrative embodiment.
Figure 4A:
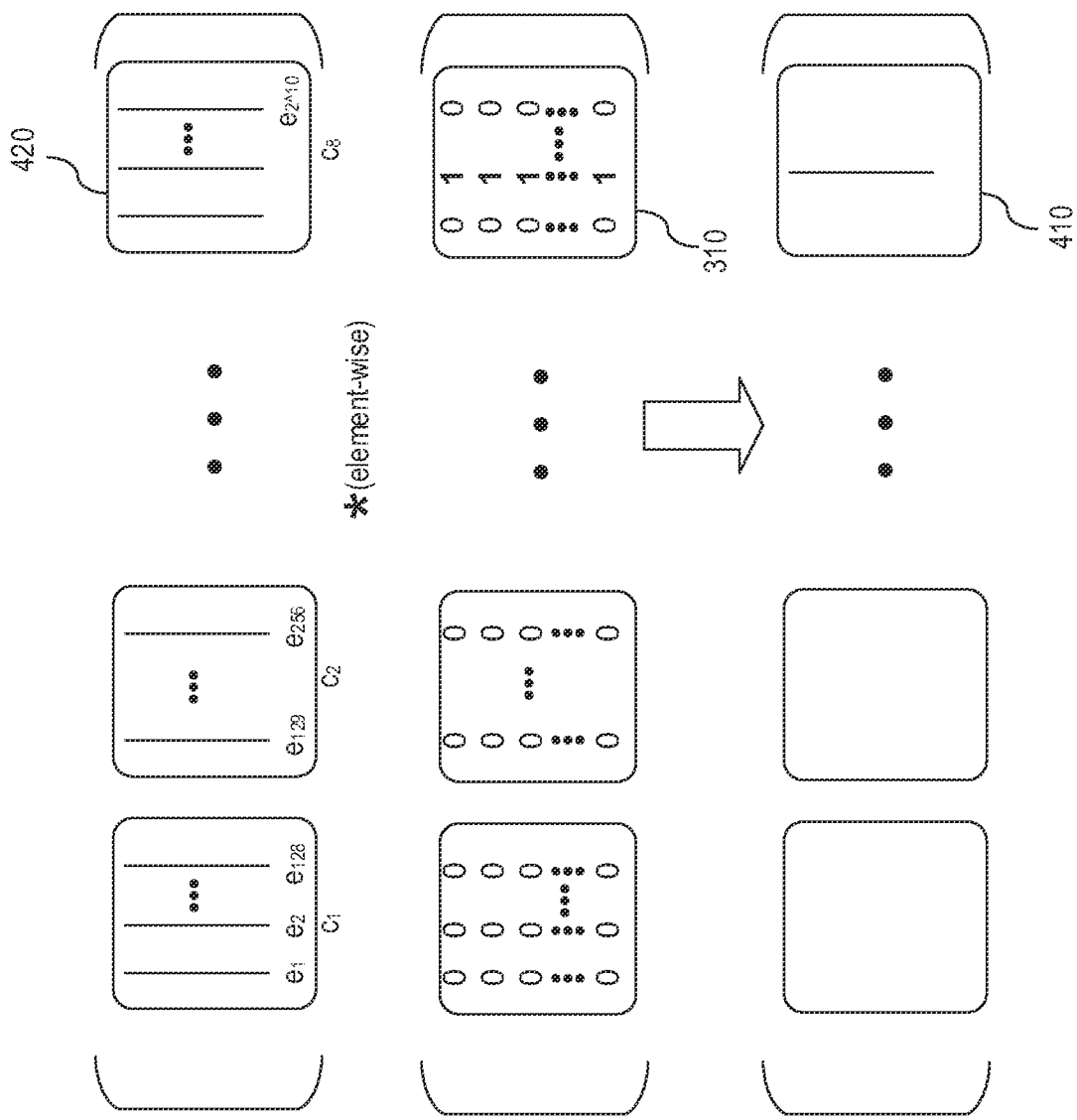
FIG. 4A is an example diagram illustrating an element-wise operation based on the ciphertext representation of an entity and the indicator ciphertext in accordance with one illustrative embodiment.

In accordance with some illustrative embodiments, the knowledge graph, e.g., knowledge graph 110, comprises 128K tuples, such as triplets of (h, l, t), as previously discussed above, where h and t refer to the head and tail entities, and l refers to the predicate. The head entity h is represented by an indicator mask, which is encrypted inside 8 ciphertexts, such that all the 8*128*128 slots in the indicator mask are 0 except a single column with is matching the column of the head entity h in the 8 entities embedding ciphertexts c1 to c8. FIG. 3 is an example diagram illustrating this indicator mask in accordance with one illustrative embodiment. As shown in FIG. 3, the ciphertext 310 with a column of is 1s the indicator mask. For example the head entity in the depicted example is entity e897, i.e., the second entity represented in the last ciphertext 310, such that the second column in the ciphertext 310 has values of 1 for each row and each other value for each other entity-feature pairing in the ciphertexts is 0. This indicator mask may be prepared, for example, by first packing the values with ciphertext packing engine 174, and then encrypting them with FHE crypto system 172. FIG. 4A shows an operation whereby the indicator mask ciphertext 310 may be used in an element-wise multiplication to extract a specific entity from the entity ciphertext representation 420 to generate output 410.

The tail entity t is encrypted similarly using 8 ciphertexts that encrypt the corresponding indicator mask. Each predicate l is encrypted similarly using a single ciphertext that encrypts the corresponding indicator mask, corresponding to the single predicate embeddings ciphertext.

In training a FHEEGE engine 170 machine learning (ML) computer model, such as ML computer model 176, to perform the graph embedding for these entities and predicates, in accordance with some illustrative embodiments, a batch size of 128 randomly selected samples of the tuples (h, l, t) from the input knowledge graph 110 are selected, and corresponding "corrupted" tuples, or triplets, are generated, e.g., (h, l, t') or (h', l, t). That is, for each sampled tuple (h, l, t), a matching corrupted tuple replaces the head entity h or tail entity t with a random h' or t' taken from the entities e1 through e1024. The representation of h' and t' is the same as shown in FIG. 2, except that now 8 plaintexts can be used instead of 8 ciphertexts, because the random identities of the h' & t' entities do not need to be hidden, however ciphertexts can be used if desired by the particular implementation.

The FHEEGE engine 170 machine learning computer model 176 is trained, in some illustrative embodiments, using stochastic-gradient-descent (SGD), but the illustrative embodiments are not limited to such and other training algorithms may also be utilized. Assuming a SGD based training of the machine learning computer model, at each iteration of the SGD, the resulting embeddings for the entities and predicates are normalized so that they are on the 128 dimensional unit circle. For example, an encrypted embedding vector E=[e1, e2, ..., e128] may be normalized by multiplying each of the slots by the value $$\frac{1}{\sqrt{e1^2 + e2^2 + \ldots + e128^2}}.$$

The function 1/sqrt(x) may be estimated with a low degree polynomial, but still the computation of this polynomial under FHE is costly. The illustrative embodiments provide mechanisms to perform this function for many entities at once using SIMD processing.

As noted above, the embeddings for the K entities are packed into ciphertexts, such as the 8 ciphertexts shown in FIG. 2. In order to estimate the function 1/sqrt(x) using a SIMD processing approach, each ciphertext is multiplied with itself to provide the square operations on all the embeddings. The elements of each entity/column are summed, by the FHE crypto-system 172, such that the sum result for each entity/column is duplicated along the entire column, as can be made to occur when performing such a sum using CTile Tensors, or the like. The polynomial that computes 1/sqrt(x) is then applied over the ciphertexts to compute the normalization factor for all the embedding values, e.g., K*128 embedding values, such that each normalization factor is in a location in the ciphertexts that matches the location of the embedding to be factored. For example, the first column will contain the normalization factor for $e_1$, the second column will contain the normalization factor for $e_2$, and so on. The normalization factors are multiplied, element-wise, with the ciphertexts of the entity embeddings to normalize the entity embeddings.

The application of the polynomial that computes 1/sqrt(x) is the computationally expensive operation as it computes the approximating polynomial, assuming the 8 ciphertext example of FIG. 2, 8 times for the 8 ciphertexts. Alternatively, since the rows in the result of summing the elements of each entity/column are identical ⅛ of the identical rows (i.e., 16 rows) from each of the 8 ciphertexts may be extracted by multiplying each of the 8 ciphertexts with a matching indicator ciphertext that holds 1 in the extracted rows and 0 elsewhere. That is, when the sum mentioned above is performed, the sum is duplicated across the columns. This makes all rows identical. For example, for the following 2×2 matrix:

| 1 | 2 |
|---|---|
| 10 | 20, | after summing along the columns, one gets:

| 11 | 22 |
|---|---|
| 11 | 22, | which makes the rows identical.

Figure 4B:
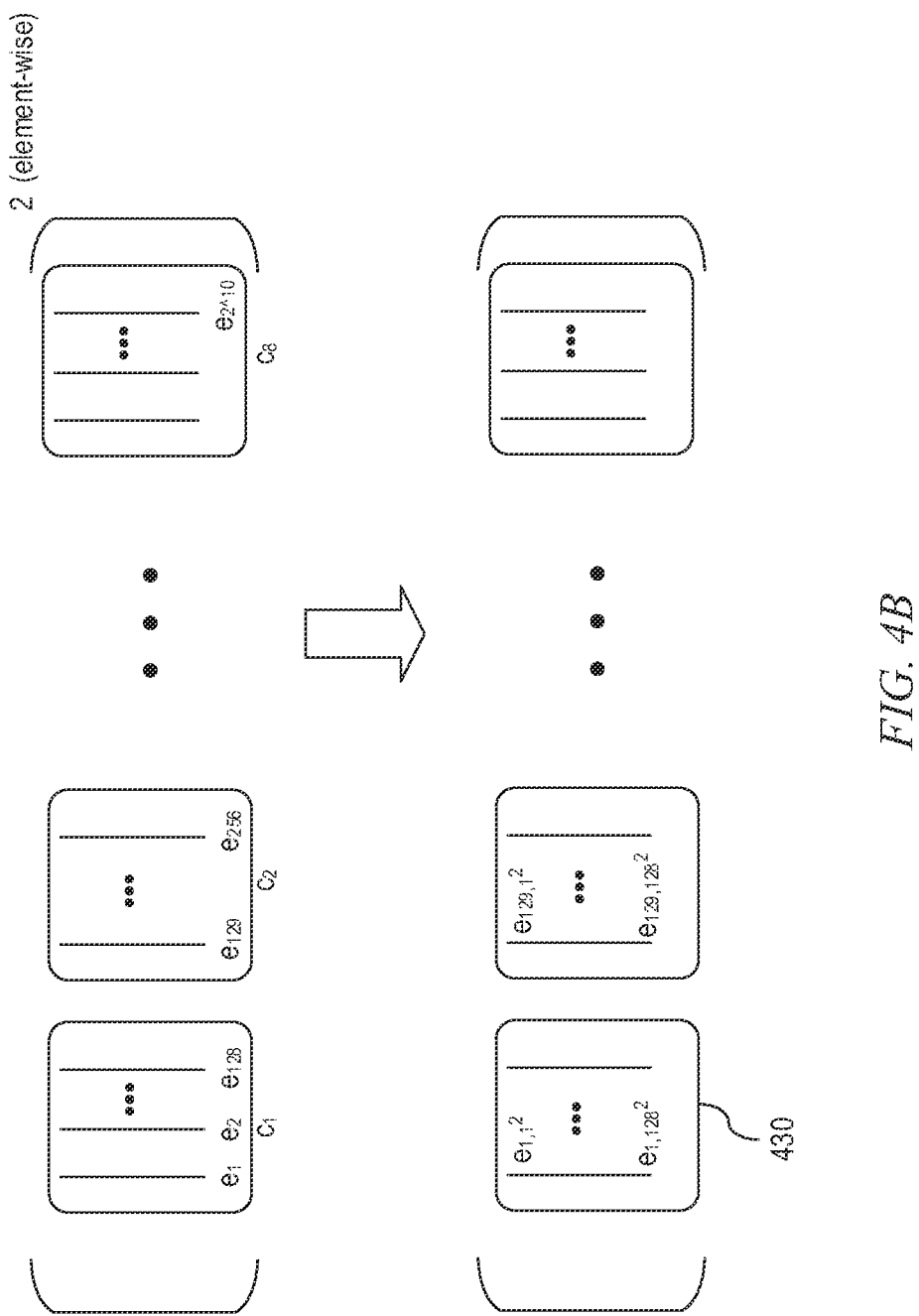
FIG. 4B shows an example operation for computing the element wise square on the entities matrix in accordance with one illustrative embodiment.

Then, with additions, the 8 sets of rows, extracted by extracting ⅛ of the rows from each of the 8 ciphertexts, are packed together into one ciphertext. FIG. 4B shows an example operation for computing the element wise square on the entities matrix. FIG. 4C shows an example operation for summing over the rows with the result 430 being duplicated over the rows. As can be seen in FIGS. 4B and 4C, each of the rows in the result 430 comprise the same element values, and the same is true of the result of the summed rows operation, i.e., 435 comprising summed elements $s_1 \ldots s_{129}$, etc. Thus, utilizing the duplicated result 430 enables the solution to duplicate sumSqr $s_i$ over all rows ($s_i$ being the sum of the corresponding elements), and thus, computing 210 normalizations at approximately the same time. This may be accomplished, in one illustrative embodiment, by executing, for example, the Remez approximation of 1/sqrt on the ciphertexts with the duplicated $s_i$ elements. Other approximations may also be used without departing from the spirit and scope of the present invention, as may be suitable to the particular implementation.

Figure 4D:
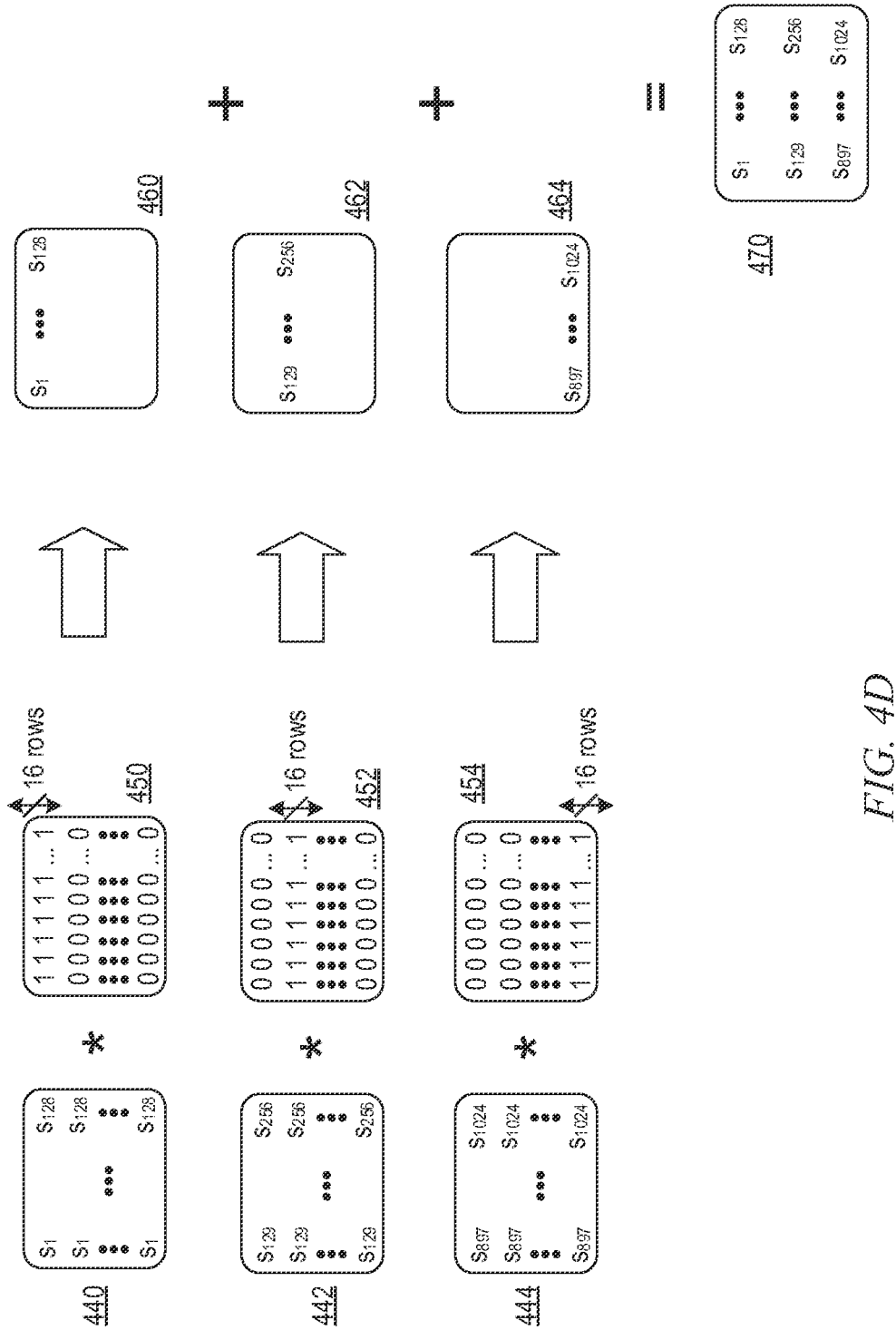
FIG. 4D shows an example of extracting rows from input ciphertexts and packing the extracted rows into an output ciphertext in accordance with one illustrative embodiment.

Alternatively, since the rows in the result of sumRows are identical, ⅛ of the rows of each ciphertext (e.g., 16 rows) may be extracted, such as shown in FIG. 4D. As shown in FIG. 4D, the 8 ciphertexts 440-444 are multiplied by the indicator matrices 450-454 to extract a corresponding sets of rows 460-464. Then, by additions, the 8 sets of rows may be packed together in a single ciphertext 470.

Figure 4E:
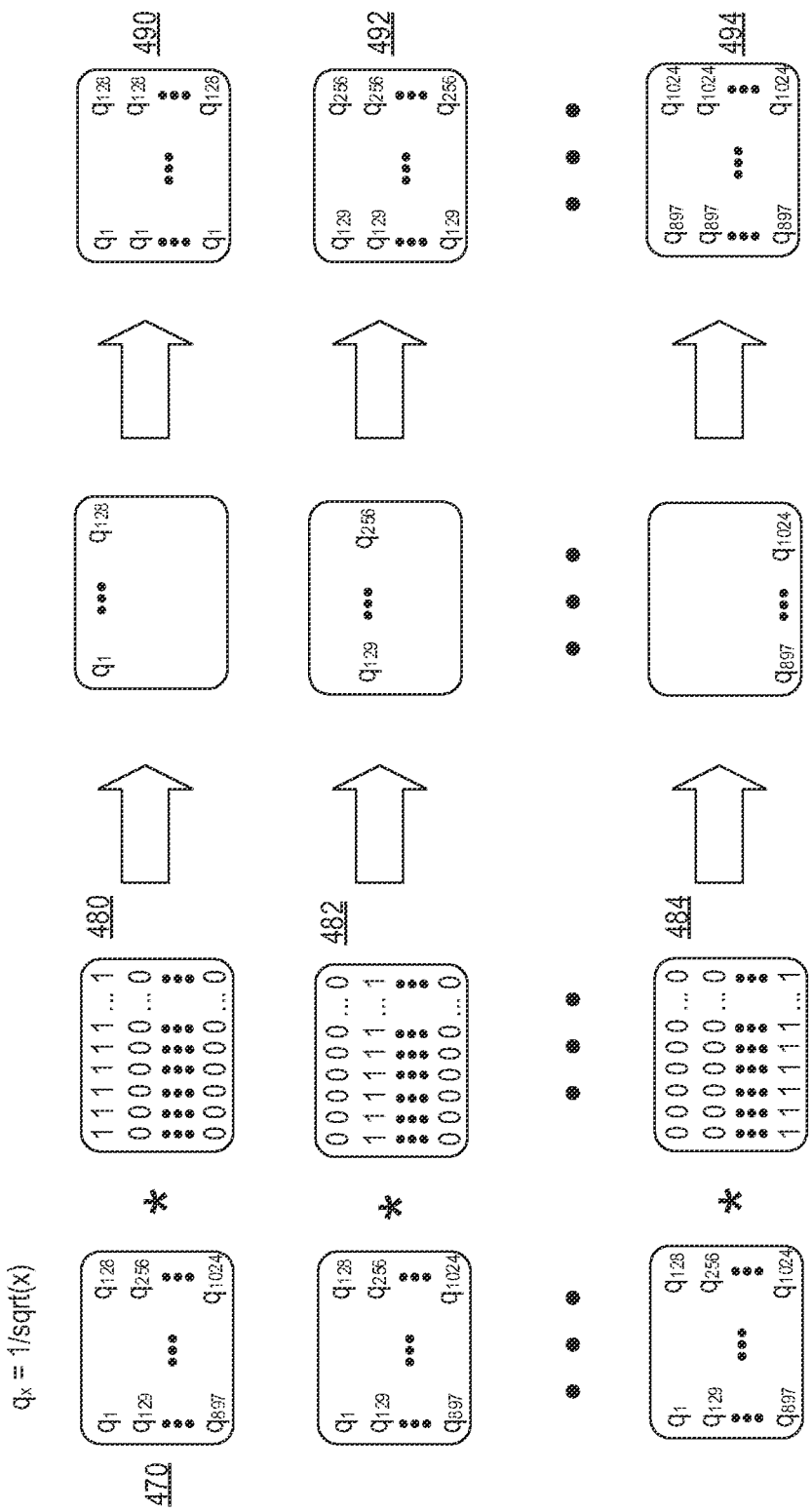
FIG. 4E shows an example of spreading the packed ciphertext in accordance with one illustrative embodiment.

Hence, by using this process to apply the polynomial, the polynomial need only be applied to this one packed ciphertext 470, taking ⅛ of the computational time and computational resources. Then, before continuing to the element-wise normalization, packed ciphertext 470 is spread back into 8 ciphertexts each having 16 identical rows with the result of the polynomial. As shown in FIG. 4E, the spreading is performed by multiplying the packed ciphertext 470 by corresponding relevant masks, or indicator matrices 480-484, and then using rotations and additions to generate the result 490-494. The "extracting" of ⅛ of the identical rows, and the "spreading" of the 8 sets of rows, require some products and rotations, but these are still less computationally expensive than the ⅞ polynomial computations saved by utilizing the mechanisms of the illustrative embodiments.

The same normalization procedure is applied to the (single) ciphertext holding the embeddings of the predicates. This time there is no need for the optimization described above, however, since the polynomial is already applied just once for the single ciphertext.

In performing the SGD operations, such as computing the loss function and its derivative, each sample in the training batch is a tuple of the form (h, l, t) where h and t point to entities and l points to a predicate, where h and t are represented as 8 ciphertexts and 1 indicator ciphertext, as described previously. The embeddings for h' or t' can be represented as 8 plaintexts or ciphertexts, as described above. For each of the (128) samples its corresponding contribution to the total loss function is computed and then the losses of all samples are added or summed. The contribution of a true-false pair <(h,l,t),(h,l,t')> to the loss may be computed by the relationship shown in Eq. (1) above, for example.

Since t and t' are normalized to the unit circle, it follows that $t^2=t'^2=1$ and after a few derivations and cancelations the expression in Eq. (1) above may be simplified to the expression in Eq. (2) above. For simplicity, the name "S" is given to the input of the RELU operation of the loss function, i.e., S=λ+2*SE((t'−t)*(h+l)) and thus, the loss function Loss(<(h,l,t),(h,l,t')>)=RELU(S). Again, it should be noted that this loss expression is more efficient to compute over FHE than the expression in Eq. (1), which includes two SE computations instead of just one in the final version of Eq. (2), which are relatively expensive to compute. It should also be noted that S and the dependent Loss value depend on the sample <(h,l,t),(h,l,t')>, so hereafter S_i and Loss_i are used to refer to these values as computed for the $i^{th}$ sample.

For the SGD learning process performed by the ML computer model 176, the derivative of this Loss expression is computed with respect to all the embeddings of the entities and predicates. For example, the following is the derivative of the loss with respect to the $i^{th}$ embedding of the head entity h. In the following h_i, t_i, t'_i are the $i^{th}$ embeddings of h, t, and t', respectively, while d(f(x))/d(x) denotes the derivative of f(x) with respect to x, sign(x)=if (x>0) then 1, else 0:

$$d(Loss)/d(h\_i)=d(Loss)/d(S)*d(S)/d(h\_i)=d(ReLU(S))/d(S)*d(S)/d(h\_i)=sign(S)*d(S)/d(h\_i)=sign(S)*2(t\_i-t'\_i)$$

where the Loss, in accordance with some illustrative embodiments, is the loss function described previously, for example, such as shown in Eq. (1) and the optimization of Eq. (2).

Thus, the expression for the Loss derivative for the entire vector h of h's embeddings is Loss derivative d(Loss)/d(h) =sign(S)*2(t'−t), where the result is a vector of size 128 with derivatives for h's 128 embeddings, t'−t is a vector subtraction of two vectors with 128 elements, and sign(S) is a scalar (1 or 0) but will in practice be computed as a vector of all 1s or of all 0s depending on the sign of S. The loss derivative expression for the predicate l and tail entity t are similar, and can be derived and handled similarly in the following operations.

In performing the SGD based training of the ML computer model 176, for example, the SGD based training is based on the loss derivative expression above, i.e., d(Loss)/d(h)=sign(S)*2(t'−t) and involves the following operations:

1. for every sample i of the form <(h,l,t),(h,l,t')> compute S_i=X+2*SE((t'−t)*(h+l)) where S_i is a scalar.
2. compute the scalar sign(S_i)
3. multiply the result of step 2 by 2(t'−t) so that the scalar sign (S_i) is multiplied by the vector 2(t'−t) taken from the $i^{th}$ sample <(h,l,t),(h,l,t')>.
4. For the entity h of sample i, update the embeddings of h by adding the result of step 3 to h (both being vectors of size 128).

The following description elaborates on the above 4 steps, and shows how to perform them efficiently with an FHE crypto-system in accordance with some illustrative embodiments, by computing many of the required scalars and vectors at substantially a same time in parallel using the SIMD operations of the FHE crypto-system 172. As noted previously, the expensive parts of the above 4 operations are the computation of the element sums (SE) which involve ~log(128)=7 rotations, and the computation of the sign which involves computing the estimating polynomial.

In operation 1 above, i.e., compute S_i=X+2*SE((t'−t)* (h+l)) for all 128 samples at substantially the same time in parallel, recall that h, l, t, and t' are each given as a plurality of ciphertexts, such as the 8 ciphertexts described above and shown in FIG. 2. Thus, in accordance with some illustrative embodiments, (t'−t) can also be expressed as the 8 corresponding pairwise subtractions of the 8 ciphertexts of t and the 8 ciphertexts of t'. The result would be 8 "indicator" ciphertexts with all 0s, except 1's in the column for t, and −1 in the column for t'. If t and t' happen to point to the same entity, then the 8 ciphertexts would encrypt all 0s. The 8 ciphertexts of the (t'−t) indicators can now be multiplied element-wise with the 8 ciphertexts of entity embeddings in order to extract the values of (t'−t) for sample i.

Finally all the columns in all 8 ciphertexts of (t'−t) are summed and the result is placed in the left-most column of a single ciphertext with the other columns being all 0. Thus the result of (t'−t) for the 1st sample (h, l, t, t') is a single ciphertext encrypting:

CTT_1=

| Column 1 | Column 2 | ... | Column 128 |
|---|---|---|---|
| t1 − t1' | 0 | ... | 0 |
| t2 − t2' | 0 | ... | 0 |
| ... | ... | ... | ... |
| t128 − t128' | 0 | ... | 0 |

The result for (h+l) for the 1st sample is similarly computed into another ciphertext

CHL_1=

| Column 1 | Column 2 | ... | Column 128 |
|---|---|---|---|
| h1 + l1' | 0 | ... | 0 |
| h2 + l2' | 0 | ... | 0 |
| ... | ... | ... | ... |
| h128 + l128' | 0 | ... | 0 |

Figure 5:
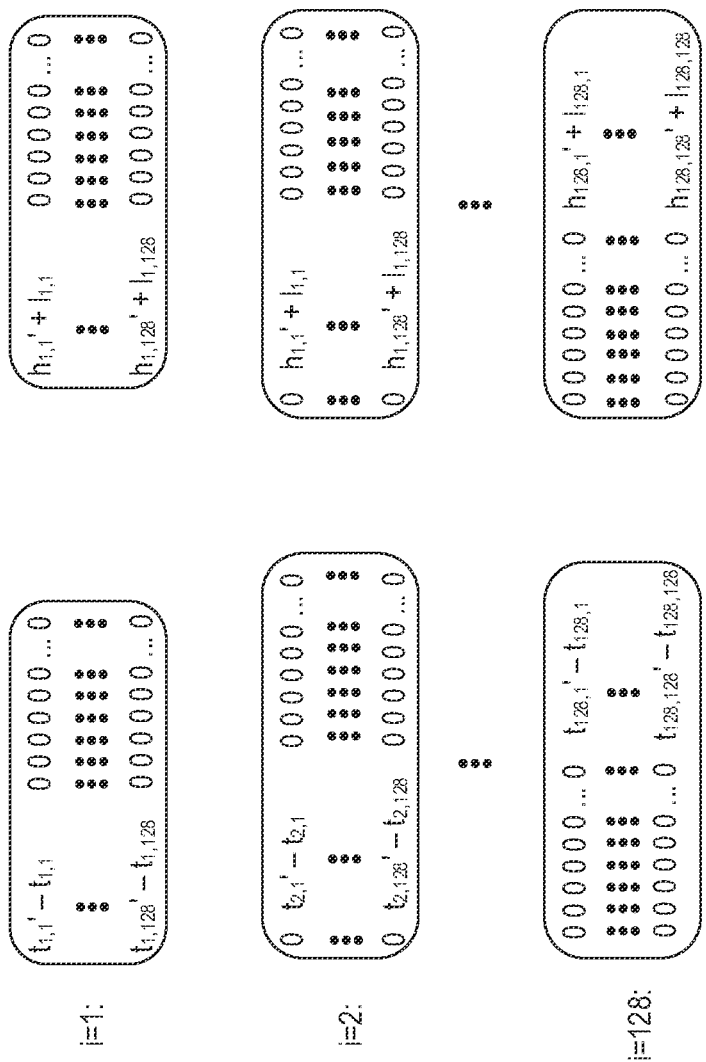
FIG. 5 is an example of ciphertext based operation results generated for operations on a head entity (h), tail entity (t), predicate (l), and corrupted tail entity for performing loss computations in accordance with one illustrative embodiment.

FIG. 5 shows an example of ciphertexts generated for samples i=1 to i=128 in accordance with one illustrative embodiment. There are 128 samples, so CTT_i is computed for sample i as above, but the final result vector is placed in column i and the other columns are all 0. Similarly CHL_i for sample i computes the result vector (h+l) in column i and the other columns are all 0. This is possible to achieve with appropriate rotations and additions.

Figure 6:
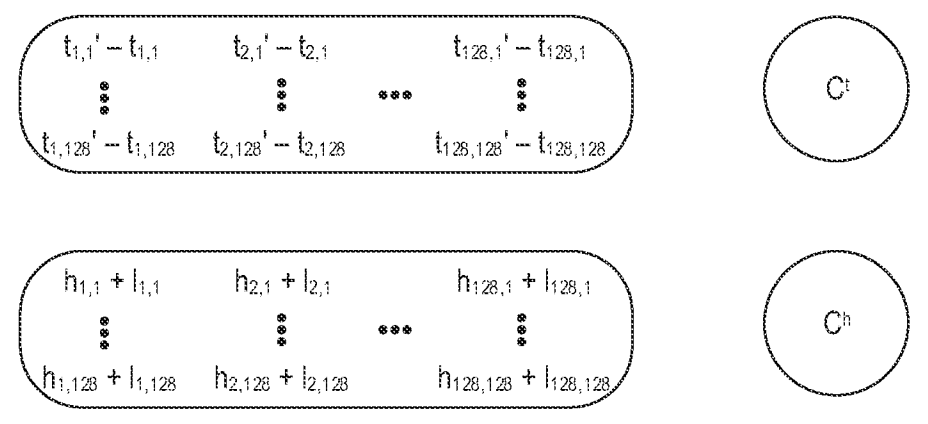

As shown in FIG. 6, the sum of all the CTT_i ciphertexts (for i in [1,128] corresponding to the $i^{th}$ sample) is computed to generate $C^T$. Similarly, the sum of all the CHL_i ciphertexts are summed (for i in [1,128] corresponding to the $i^{th}$ sample) to generate $C^H$. In this way, the results of 128 different computations are packed into one ciphertext for $C^T$ and one for $C^H$ as shown in FIG. 6. Using $C^T$ and $C^H$, 128 multiplications can be performed at approximately the same time by multiplying $C^H*C^T$ using SIMD processing. These multiplication results can then be used to do 128 sum operations at approximately the same time using SIMD processing, and an approximate sign may be applied on the 128 sum results at approximately the same time using SIMD processing. That is, an element-wise homomorphic operation is computed over the two ciphertexts as C_TT_HL=CTT*CHL, and SE(C_TT_HL) is computed so that the sum of each column of C_TT_HL is now duplicated over the entire set of columns. The above results are added to themselves, thus in effect multiplying by 2, and a ciphertext encrypting all λ's (scalar coming from the loss formula) in all the slots is added to the ciphertext encrypting C_TT_HL just computed.

At this point there is a single ciphertext where column i contains S_i for sample i in all the column slots. Thereafter, the sign(S_i) is computed for all the samples at approximately the same time using parallel processing provided in a SIMD computer architecture. That is, the approximating polynomial for the sign function is computed over the ciphertext that resulted from the first operation 1 of the 4 operations. This computes the sign separately for every slot, and the result is a ciphertext where column i contains the sign of S_i for sample i in all the column slots. This ciphertext is referred to herein as sign(S).

In operation 3 of the 4 operations above, the derivatives with respect to h for all samples by multiplying the above sign(S) ciphertext by 2(t'−t). This may be accomplished by first adding sign(S) to itself, in effect computing 2sign(S), and then computing the H_derivatives by multiplying the ciphertext encrypting 2sign(S), just computed, with CTT (see operation 1 above). Column i of 2sign(S) holds twice the sign of S of sample i in all the column slots. Column i of CTT holds the 128 different embedding differences of ti−t'i of sample i. Thus, column i of the H_derivatives gives the 128 derivatives of Loss_i with respect to the 128 embeddings of entity h of sample i. T_derivatives can be similarly computed for the derivatives with respect to the t entities of the samples. L_derivatives does not need to be computed separately because it is equal to H_derivatives.

For the fourth operation of the 4 operations set forth above, the SGD operation is performed by updating the embeddings based on the derivatives computed above. Column i of the H_derivatives ciphertext gives the 128 derivatives of Loss_i with respect to the 128 embeddings of entity h of sample i. h itself is represented as 8 indicator ciphertexts corresponding to the 8 ciphertexts holding the current entity embeddings, such as shown in FIG. 2.

The SGD operation is performed by first generating H_derivatives as H_derivatives*LR (LR is the learning-rate for the SGD algorithm). Then, for each i in [1,128], H_derivatives_i is computed by duplicating column i of H_derivatives over all 128 columns of H_derivatives_i. Then, H_i_step is generated as 8 ciphertexts computed as the products of all 8 indicator ciphertexts of h (from the $i^{th}$ sample) with the ciphertext H_derivatives_i. The 8 ciphertexts of H_i_step are added to the 8 ciphertexts of entities_embeddings to thereby generate the updated entity embeddings. T_derivatives is similarly used to update entities_embeddings, and L_derivatives is similarly used to update predicates_embeddings.

This process may be repeated for a predetermined number of epochs to generate a final set of entity and predicate embeddings. The embeddings are generated on encoded and encrypted data and provides an improved computing tool that makes it possible to perform fully homomorphic encryption enabled graph embedding (FHEEGE) functionality. Thus, the graph embeddings are generated without exposing the private data. The ciphertext representations, indicator ciphertexts, optimized loss function operations, and the like, of the illustrative embodiments, allow such FHEEGE functionality to be performed efficiently and in a manner that makes the operation feasible given current computing capabilities by using SIMD processing on the ciphertexts and indicator ciphertexts. As noted above, the resulting graph embeddings may be used to train a machine learning model to perform artificial intelligence based operations, submit queries to a trained machine learning model to generate classifications/predictions based on the graph embeddings, update the knowledge graph with relationships (predicates) between entities not previously present in the knowledge graph but for which a probability or confidence value is generated by a trained machine learning computer model based on the graph embeddings, that meets or exceeds a threshold probability/confidence, or the like.

As described above, the illustrative embodiments of the present invention are specifically directed to an improved computing tool that enables fully homomorphic encryption enabled graph embedding (FHEEGE) computer functionality. All of the functions of the illustrative embodiments as described herein are intended to be performed using automated processes without human intervention. While a human being, e.g., a user of a social media network that may be represented as an input knowledge graph or ontology, a patient whose electronic medical record is represented in an input knowledge graph, or the like, may be represented in the data of an input knowledge graph or other graph data structure that is input to the FHEEGE engine of the illustrative embodiments, the illustrative embodiments are not directed to actions performed by the patient, but rather logic and functions performed specifically by the improved computing tool on the input knowledge graph, or other graph data structure, to thereby encode and encrypt the private data of the input knowledge graph and perform fully homomorphic encryption enabled graph embeddings. Moreover, even though the present invention may provide a graph embedding output that may be used to train machine learning computer models, provide queries to a trained machine learning computer model, update the knowledge graph based on an evaluation of relationships between entities specified by such graph embeddings, and the like, and the results of these operations may ultimately assists human beings, the illustrative embodiments of the present invention are not directed to actions performed by the human being viewing or otherwise utilizing the results, but rather to the specific operations performed by the specific improved computing tool of the present invention which facilitate fully homomorphic encryption enabled graph embeddings. Thus, the illustrative embodiments are not organizing any human activity, but are in fact directed to the automated logic and functionality of an improved computing tool.

Figure 7:
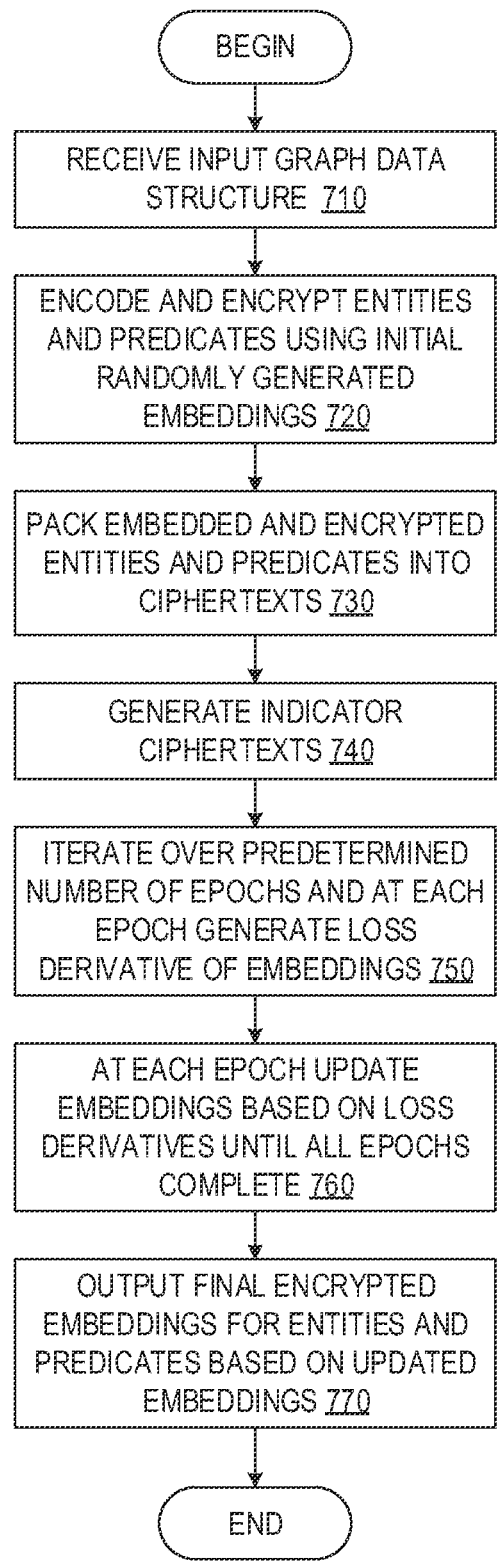
FIG. 7 is a flowchart outlining an example of a fully homomorphic encryption enabled graph embedding operation in accordance with one illustrative embodiment.

FIG. 7 is a flowchart outlining an example operation for performing fully homomorphic encryption enabled graph embeddings in accordance with one or more illustrative embodiments. It should be appreciated that the operations outlined in FIG. 7 are specifically performed automatically by an improved computer tool of the illustrative embodiments and are not intended to be, and cannot practically be, performed by human beings either as mental processes or by organizing human activity. To the contrary, while human beings may, in some cases, initiate the performance of the operations set forth in FIG. 7, and may, in some cases, make use of the results generated as a consequence of the operations set forth in FIG. 7, the operations in FIG. 7 themselves are specifically performed by the improved computing tool in an automated manner.

As shown in FIG. 7, the operation starts by receiving an input knowledge graph, or other graph data structure, comprising a plurality of entities and edges, where the edges represent relationships, or "predicates," between the entities (step 710). The entities and predicates are encoded and encrypted using an initial randomly generated embedding of the entities and predicates (step 720). The encrypted embedded entities and encrypted embedded predicates are packed into corresponding sets of ciphertexts (step 730) and corresponding indicator ciphertexts are generated (step 740). For a predetermined number of epochs, at each epoch, the loss derivative of the encrypted embeddings is homomorphically computed by performing SIMD processing of operations using the ciphertexts and indicator ciphertexts of the entities and predicates (step 750). At each epoch, the loss derivative is subtracted from the current embedding and the embedding is updated with the result (step 760). The resulting encrypted embeddings after the predetermined number of epochs have been executed, are then output as the final embeddings of the entities and predicates in the input knowledge graph (step 770) for downstream use, such as submitting queries to a machine learning computer model based on the input knowledge graph, training a machine learning computer model to perform classifications/predictions based on the input knowledge graph, updating the knowledge graph with relationships (predicates) between entities not previously present in the knowledge graph, or the like.

The fully homomorphic encryption enabled graph embedding computing tool of the illustrative embodiments may be utilized to provide graph embeddings, while maintaining the privacy of the input data, in various applications. For example, in some illustrative embodiments, once the input knowledge graph, ontology, or other graph data structure is embedded by way of the fully homomorphic encryption enable graph embedding operations, the embeddings can be used by machine learning computer models to make predictions about relations that were not directly observed before in the original knowledge graph, ontology, or other graph data structure. For example, the input knowledge graph may represent "friend" relations between pairs of users of a social network, similarities between symptoms between patients, or any other relationship between entities.

As noted above, the illustrative embodiments are especially well suited to computing environments in which privacy of data is maintained. An example of such a computing environment is one in which the fully homomorphic encryption enabled graph embedding operations are provided as a cloud service to clients and/or when the machine learning computer models are provided as a cloud service with instances of such machine learning computer models being trained using client data at a server side and results are returned to the client. In these environments, without the mechanisms of the illustrative embodiments, client data would need to be provided to the cloud service provided on the server side and thus, there is a risk of exposure of private data to third parties. With the mechanisms of the illustrative embodiments, however, the client data may be encoded and encrypted at the client side, yet the embeddings and machine learning computer model training may be performed on the encoded and encrypted client data and thereby avoid exposure of private data.

Figure 8:
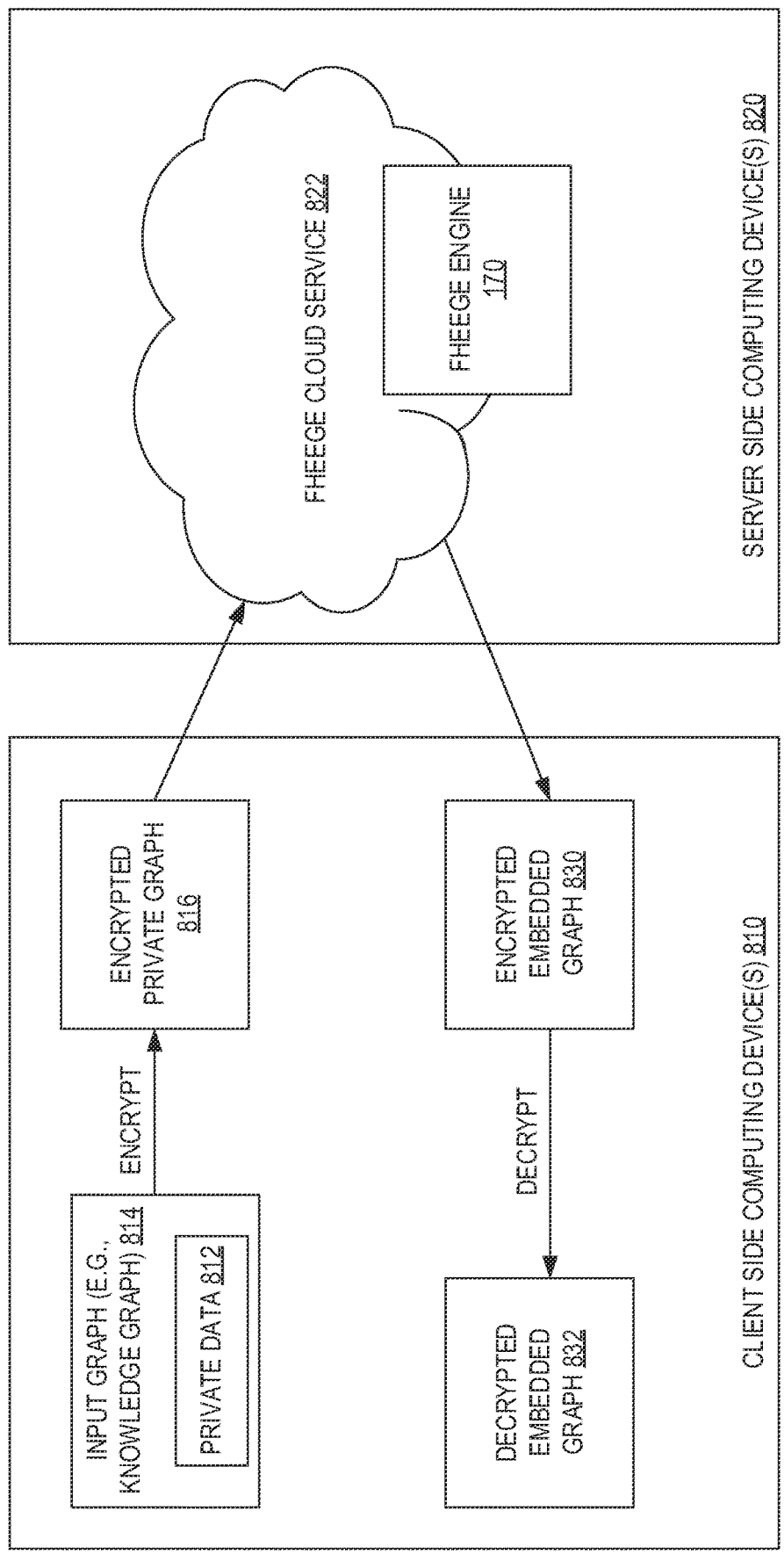
FIG. 8 is an example diagram of one illustrative embodiment where a user at a client side has private data in an input knowledge graph which are encrypted to generate an encrypted private graph that is output to the server side fully homomorphic encryption enabled graph embedding (FHEEGE) cloud service.

For example, FIG. 8 is an example diagram of one illustrative embodiment where a user at a client side 810 has private data 812 in an input knowledge graph 814 which are encrypted to generate an encrypted private graph 816 that is output to the server side 820 fully homomorphic encryption enabled graph embedding (FHEEGE) cloud service 822. The FHEEGE cloud service 822 may be provided by the FHEEGE engine 170 of FIG. 1, for example, which may be implemented on one or more server computing devices (not shown) providing the FHEEGE cloud service 822. The FHEEGE cloud service 822 may generate the graph embeddings for the encrypted private graph 816 by applying the FHEEGE operations including generation of ciphertext representations of entities and predicates and performance of operations on the ciphertexts using SIMD processing, in accordance with one or more of the illustrative embodiments discussed above. The graph embeddings are then returned to the client side 810 as the encrypted embedded graph 830. The client side 810 computing device may then decrypt the encrypted embedded graph 830 to output the decrypted embedded graph data structure 832. This illustrative embodiment uses the server side 820 compute power to embed/train the FHEEGE engine's machine learning computer model, to embed the encrypted input knowledge graph 816 and provide the encrypted results back which may then be decrypted by the client side 810.

Figure 9:
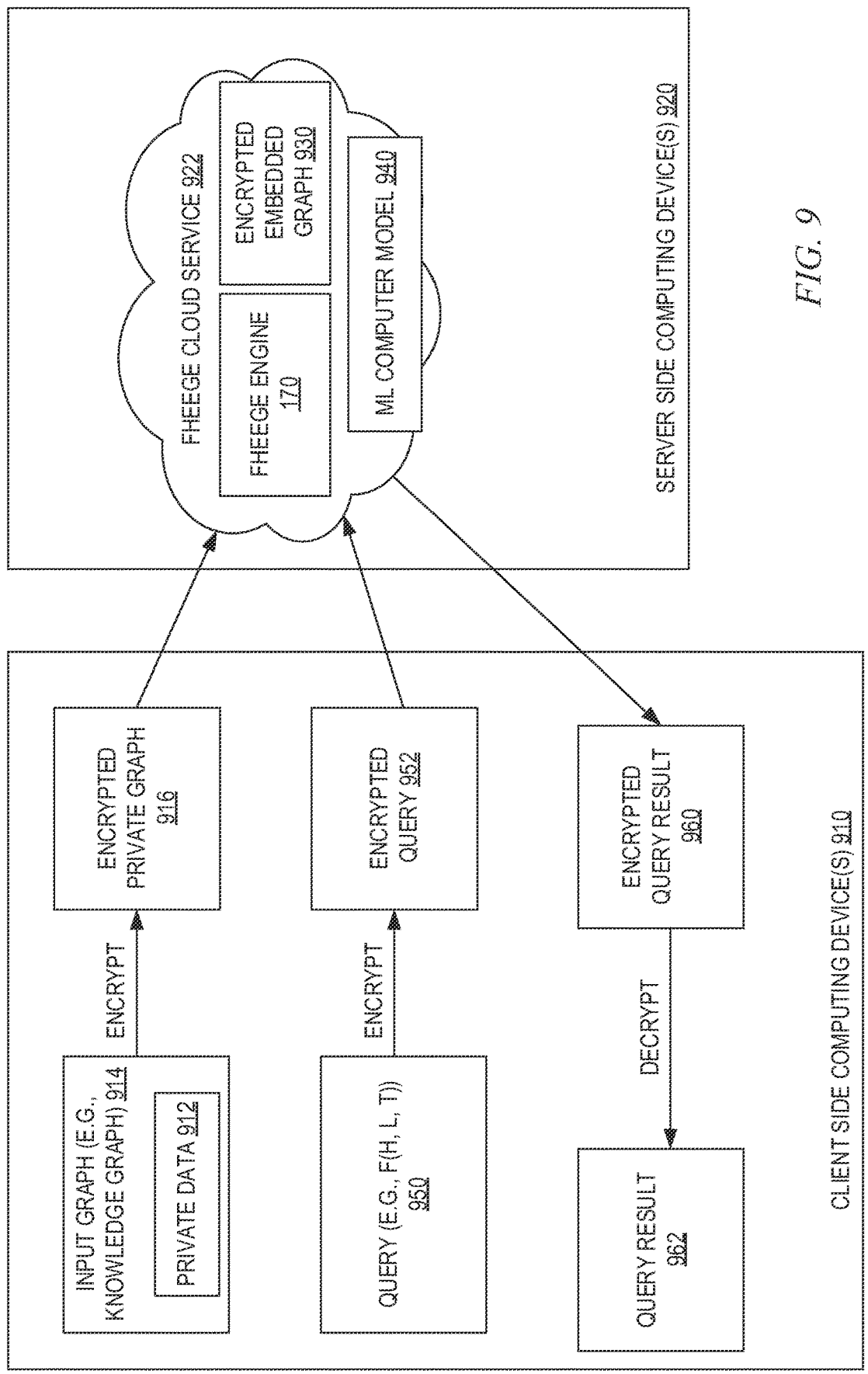
FIG. 9 is an example diagram of another illustrative embodiment in which the server side cloud service trains a machine learning computer model instance for the client side user, such that the server side cloud service processes encrypted queries and provides encrypted query results based on the trained machine learning computer model.

FIG. 9 is an example diagram of another illustrative embodiment in which the server side cloud service trains a machine learning computer model instance for the client side user, such that the server side cloud service processes encrypted queries and provides encrypted query results based on the trained machine learning computer model. As shown in FIG. 9, similar to FIG. 8, the client side 910 computing devices may provide the private graph data structure 914, such as a knowledge graph or the like that has private data 912, which is encrypted to generate encrypted private graph 916. The encrypted private graph 916 is provided to the server side 920 in a similar manner as described above with regard to FIG. 8, which provides the FHEEGE cloud service 922 to embed the encrypted private graph 916 using the FHEEGE mechanisms and operations of one or more of the illustrative embodiments described above. In addition, the server side 920 trains a machine learning computer model 940 based on the encrypted embedded graph 930, where the machine learning computer model 940 is trained to process encrypted queries specifying an encrypted head entity, encrypted predicate, and encrypted tail entity.

That is, the client side 910 may generate a query 950, such as f(Acme Inc, basedIn, Liverpool) in the example previously described above with regard to FIG. 1, or f(h, l, t) where h is the head entity, l is the predicate or relationship being queried, and t is the tail entity. The query asks what is the probability that a relation exists between the specified entities, e.g., that two patients share some given symptom or the like. Alternatively, the query can request that the server side cloud services suggest new relations (edges) that are not yet in the input private graph 912 but exists with high probability, e.g., new fiend pairs or the like in a social networking computer environment.

This query may be encrypted using the same encryption mechanisms used to encrypt the private graph 916 to generate the encrypted query 952 on the client side, and provide the encrypted query 952 to the server side 920 cloud services. The encrypted query may then be embedded using the FHEEGE cloud service 922 and the encrypted embedded query may then be processed as an input to the trained machine learning computer model 940. The trained machine learning computer model 940 generates an encrypted query result 960 which is then provided back to the client side 910. The encrypted query result 960 may specify a confidence or probability that the queried relationship is true. The encrypted query result 960 may be decrypted at the client side 910 to output the query results 962, which may be used at the client side 910 to perform other artificial intelligence operations or generate suitable outputs, update the private graph 912, or the like.

Figure 10:
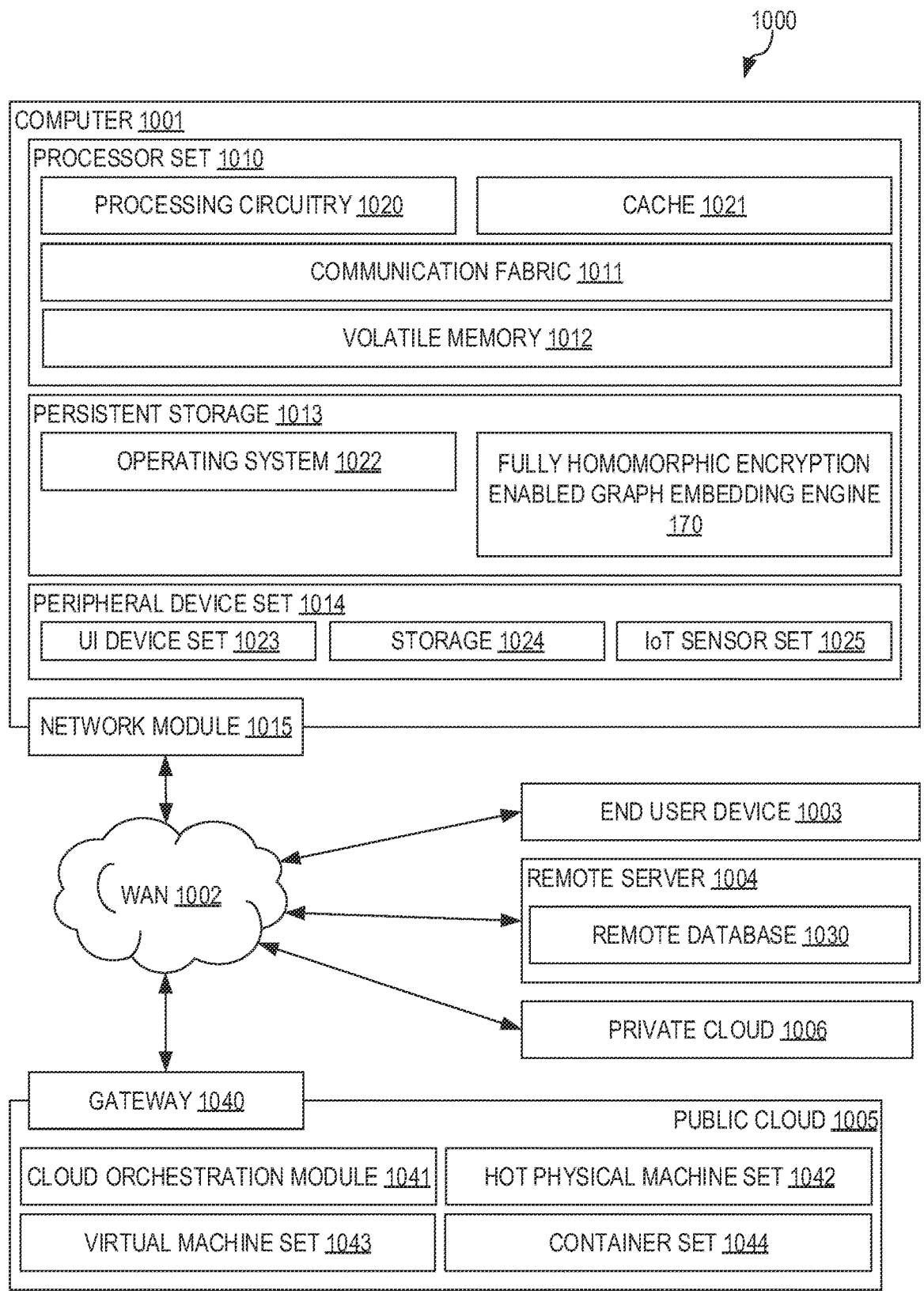
FIG. 10 is an example diagram of a distributed data processing system environment in which aspects of the illustrative embodiments may be implemented and at least some of the computer code involved in performing the inventive methods may be executed.

FIG. 10 is an example diagram of a distributed computing environment in which aspects of the illustrative embodiments may be implemented. As shown in FIG. 10, the computing environment 1000 contains an example of an environment for the execution of at least some of the computer code involved in performing the inventive methods, such as the fully homomorphic encryption enabled graph embedding (FHEEGE) engine 170 in FIG. 1. In addition to block 170, computing environment 1000 includes, for example, computer 1001, wide area network (WAN) 1002, end user device (EUD) 1003, remote server 1004, public cloud 1005, and private cloud 1006. In this embodiment, computer 1001 includes processor set 1010 (including processing circuitry 1020 and cache 1021), communication fabric 1011, volatile memory 1012, persistent storage 1013 (including operating system 1022 and block 170, as identified above), peripheral device set 1014 (including user interface (UI), device set 1023, storage 1024, and Internet of Things (IoT) sensor set 1025), and network module 1015. Remote server 1004 includes remote database 1030. Public cloud 1005 includes gateway 1040, cloud orchestration module 1041, host physical machine set 1042, virtual machine set 1043, and container set 1044.

Computer 1001 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1030. As is well understood in the art of computer technology, and depending upon the technology, performance of a computer-implemented method may be distributed among multiple computers and/or between multiple locations. On the other hand, in this presentation of computing environment 1000, detailed discussion is focused on a single computer, specifically computer 1001, to keep the presentation as simple as possible. Computer 1001 may be located in a cloud, even though it is not shown in a cloud in FIG. 10. On the other hand, computer 1001 is not required to be in a cloud except to any extent as may be affirmatively indicated.

Processor set 1010 includes one, or more, computer processors of any type now known or to be developed in the future. Processing circuitry 1020 may be distributed over multiple packages, for example, multiple, coordinated integrated circuit chips. Processing circuitry 1020 may implement multiple processor threads and/or multiple processor cores. Cache 1021 is memory that is located in the processor chip package(s) and is typically used for data or code that should be available for rapid access by the threads or cores running on processor set 1010. Cache memories are typically organized into multiple levels depending upon relative proximity to the processing circuitry. Alternatively, some, or all, of the cache for the processor set may be located "off chip." In some computing environments, processor set 1010 may be designed for working with qubits and performing quantum computing.

Computer readable program instructions are typically loaded onto computer 1001 to cause a series of operational steps to be performed by processor set 1010 of computer 1001 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1021 and the other storage media discussed below. The program instructions, and associated data, are accessed by processor set 1010 to control and direct performance of the inventive methods. In computing environment 1000, at least some of the instructions for performing the inventive methods may be stored in block 170 in persistent storage 1013.

Communication fabric 1011 is the signal conduction paths that allow the various components of computer 1001 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 1012 is any type of volatile memory now known or to be developed in the future. Examples include dynamic type random access memory (RAM) or static type RAM. Typically, the volatile memory is characterized by random access, but this is not required unless affirmatively indicated. In computer 1001, the volatile memory 1012 is located in a single package and is internal to computer 1001, but, alternatively or additionally, the volatile memory may be distributed over multiple packages and/or located externally with respect to computer 1001.

Persistent storage 1013 is any form of non-volatile storage for computers that is now known or to be developed in the future. The non-volatility of this storage means that the stored data is maintained regardless of whether power is being supplied to computer 1001 and/or directly to persistent storage 1013. Persistent storage 1013 may be a read only memory (ROM), but typically at least a portion of the persistent storage allows writing of data, deletion of data and re-writing of data. Some familiar forms of persistent storage include magnetic disks and solid state storage devices. Operating system 1022 may take several forms, such as various known proprietary operating systems or open source Portable Operating System Interface type operating systems that employ a kernel. The code included in block 170 typically includes at least some of the computer code involved in performing the inventive methods.

Peripheral device set 1014 includes the set of peripheral devices of computer 1001. Data communication connections between the peripheral devices and the other components of computer 1001 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 1023 may include components such as a display screen, speaker, microphone, wearable devices (such as goggles and smart watches), keyboard, mouse, printer, touchpad, game controllers, and haptic devices. Storage 1024 is external storage, such as an external hard drive, or insertable storage, such as an SD card. Storage 1024 may be persistent and/or volatile. In some embodiments, storage 1024 may take the form of a quantum computing storage device for storing data in the form of qubits. In embodiments where computer 1001 is required to have a large amount of storage (for example, where computer 1001 locally stores and manages a large database) then this storage may be provided by peripheral storage devices designed for storing very large amounts of data, such as a storage area network (SAN) that is shared by multiple, geographically distributed computers. IoT sensor set 1025 is made up of sensors that can be used in Internet of Things applications. For example, one sensor may be a thermometer and another sensor may be a motion detector.

Network module 1015 is the collection of computer software, hardware, and firmware that allows computer 1001 to communicate with other computers through WAN 1002. Network module 1015 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1015 are performed on the same physical hardware device. In other embodiments (for example, embodiments that utilize software-defined networking (SDN)), the control functions and the forwarding functions of network module 1015 are performed on physically separate devices, such that the control functions manage several different network hardware devices. Computer readable program instructions for performing the inventive methods can typically be downloaded to computer 1001 from an external computer or external storage device through a network adapter card or network interface included in network module 1015.

WAN 1002 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 1003 is any computer system that is used and controlled by an end user (for example, a customer of an enterprise that operates computer 1001), and may take any of the forms discussed above in connection with computer 1001. EUD 1003 typically receives helpful and useful data from the operations of computer 1001. For example, in a hypothetical case where computer 1001 is designed to provide a recommendation to an end user, this recommendation would typically be communicated from network module 1015 of computer 1001 through WAN 1002 to EUD 1003. In this way, EUD 1003 can display, or otherwise present, the recommendation to an end user. In some embodiments, EUD 1003 may be a client device, such as thin client, heavy client, mainframe computer, desktop computer and so on.

Remote server 1004 is any computer system that serves at least some data and/or functionality to computer 1001. Remote server 1004 may be controlled and used by the same entity that operates computer 1001. Remote server 1004 represents the machine(s) that collect and store helpful and useful data for use by other computers, such as computer 1001. For example, in a hypothetical case where computer 1001 is designed and programmed to provide a recommendation based on historical data, then this historical data may be provided to computer 1001 from remote database 1030 of remote server 1004.

Public cloud 1005 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1005 is performed by the computer hardware and/or software of cloud orchestration module 1041. The computing resources provided by public cloud 1005 are typically implemented by virtual computing environments that run on various computers making up the computers of host physical machine set 1042, which is the universe of physical computers in and/or available to public cloud 1005. The virtual computing environments (VCEs) typically take the form of virtual machines from virtual machine set 1043 and/or containers from container set 1044. It is understood that these VCEs may be stored as images and may be transferred among and between the various physical machine hosts, either as images or after instantiation of the VCE. Cloud orchestration module 1041 manages the transfer and storage of images, deploys new instantiations of VCEs and manages active instantiations of VCE deployments. Gateway 1040 is the collection of computer software, hardware, and firmware that allows public cloud 1005 to communicate through WAN 1002.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 1006 is similar to public cloud 1005, except that the computing resources are only available for use by a single enterprise. While private cloud 1006 is depicted as being in communication with WAN 1002, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1005 and private cloud 1006 are both part of a larger hybrid cloud.

As shown in FIG. 10, one or more of the computing devices, e.g., computer 1001 or remote server 1004, may be specifically configured to implement a fully homomorphic encryption enabled graph embedding engine, cloud service, or the like, in accordance with one or more illustrative embodiments. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as computing device 1001 or remote server 1004, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates the generation of graph embeddings on encrypted graph data using fully homomorphic encryption and graph embeddings facilitated and made feasible through the ciphertext representations of entities and predicates as well as SIMD processing of operations on such ciphertext representations.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for fully homomorphic encryption enabled graph embedding, the method comprising:
    receiving an encrypted graph data structure comprising a plurality of encrypted entities and a plurality of encrypted predicates;
    generating, for each encrypted entity in the plurality of encrypted entities, a corresponding set of entity ciphertexts based on an initial embedding of entity features of the encrypted entity;
    generating, for each encrypted predicate in the plurality of encrypted predicates, a corresponding predicate ciphertext based on an initial embedding of predicate features of the encrypted predicate;
    iteratively executing a machine learning process, on the sets of entity ciphertexts and the predicate ciphertexts to update embeddings of the entity features of the encrypted entities and update embeddings of predicate features of the encrypted predicates, to generate a computer model for embedding entities and predicates; and
    outputting a final embedding based on the updated embeddings of the entity features and predicate features of the computer model.

2. The method of claim 1, wherein the iterative execution of the machine learning process comprises iteratively updating the embeddings of the entity features and embeddings of the predicate features based on a minimization of a loss function, wherein the loss function is a function of at least two entity embeddings and a predicate embedding.

3. The method of claim 1, further comprising packing at least a subset of the set of entity ciphertexts and at least a subset of set of predicate ciphertexts into a single packed ciphertext, wherein the iterative execution of the machine learning process is performed on the single packed ciphertext.

4. The method of claim 3, wherein iteratively executing the machine learning process comprises executing single instruction multiple data (SIMD) computer operations on the single packed ciphertext at approximately a same time for a plurality of entities and predicates.

5. The method of claim 1, wherein the set of entity ciphertexts comprises matrices in which each column corresponds to an entity, and each row corresponds to a feature of the entities, and wherein the set of entity ciphertexts comprises a plurality of first ciphertexts that comprise embeddings of features of corresponding entities, and an indicator ciphertext specifying a first value in elements of a column corresponding to an entity in the plurality of entities for which the set of entity ciphertexts corresponds, and a second value in all other elements of all other columns.

6. The method of claim 1, further comprising:
    training a machine learning computer model based on the final embedding as input to the machine learning computer model, to predict a probability that a relationship exists between at least two entities in the encrypted graph data structure.

7. The method of claim 1, wherein the encrypted graph data structure is received from a client computing device via at least one data network, and wherein the data processing system comprises at least one server computing device providing a cloud service that performs the operations of generating the corresponding set of entity ciphertexts, generating the corresponding predicate ciphertexts, iteratively executing the machine learning process, and outputting the final embedding.

8. The method of claim 1, wherein outputting the final embedding comprises:
    generating an encrypted embedded graph data structure based on the final embedding; and
    outputting the encrypted embedded graph data structure to a source computing device from which the encrypted graph data structure was received.

9. The method of claim 1, further comprising:
    receiving a request to verify a relationship between at least two entities of the encrypted graph data structure, wherein the request comprises an encrypted tuple specifying a first entity, a second entity, and the relationship to be verified;
    generating a measure of veracity of the encrypted tuple based on the final embedding and a distance function; and
    returning an output to an originator of the request specifying the measure of veracity of the encrypted tuple.

10. The method of claim 9, further comprising updating the encrypted graph data structure based on the output and the measure of veracity in response to the measure of veracity meeting or exceeding a predetermined threshold.

11. A computer program product comprising a computer readable storage medium having a computer readable program stored therein, wherein the computer readable program, when executed on a data processing system, causes the data processing system to:
    receive an encrypted graph data structure comprising a plurality of encrypted entities and a plurality of encrypted predicates;
    generate, for each encrypted entity in the plurality of encrypted entities, a corresponding set of entity ciphertexts based on an initial embedding of entity features of the encrypted entity;
    generate, for each encrypted predicate in the plurality of encrypted predicates, a corresponding predicate ciphertext based on an initial embedding of predicate features of the encrypted predicate;
    iteratively execute a machine learning process, on the sets of entity ciphertexts and the predicate ciphertexts to update embeddings of the entity features of the encrypted entities and update embeddings of predicate features of the encrypted predicates, to generate a computer model for embedding entities and predicates; and output a final embedding based on the updated embeddings of the entity features and predicate features of the computer model.

12. The computer program product of claim 11, wherein the iterative execution of the machine learning process comprises iteratively updating the embeddings of the entity features and embeddings of the predicate features based on a minimization of a loss function, wherein the loss function is a function of at least two entity embeddings and a predicate embedding.

13. The computer program product of claim 11, further comprising packing at least a subset of the set of entity ciphertexts and at least a subset of set of predicate ciphertexts into a single packed ciphertext, wherein the iterative execution of the machine learning process is performed on the single packed ciphertext.

14. The computer program product of claim 13, wherein iteratively executing the machine learning process comprises executing single instruction multiple data (SIMD) computer operations on the single packed ciphertext at approximately a same time for a plurality of entities and predicates.

15. The computer program product of claim 11, wherein the set of entity ciphertexts comprises matrices in which each column corresponds to an entity, and each row corresponds to a feature of the entities, and wherein the set of entity ciphertexts comprises a plurality of first ciphertexts that comprise embeddings of features of corresponding entities, and an indicator ciphertext specifying a first value in elements of a column corresponding to an entity in the plurality of entities for which the set of entity ciphertexts corresponds, and a second value in all other elements of all other columns.

16. The computer program product of claim 11, wherein the computer readable program further causes the data processing system to:

train a machine learning computer model based on the final embedding as input to the machine learning computer model, to predict a probability that a relationship exists between at least two entities in the encrypted graph data structure.

17. The computer program product of claim 11, wherein the encrypted graph data structure is received from a client computing device via at least one data network, and wherein the data processing system comprises at least one server computing device providing a cloud service that performs the operations of generating the corresponding set of entity ciphertexts, generating the corresponding predicate ciphertexts, iteratively executing the machine learning process, and outputting the final embedding.

18. The computer program product of claim 11, wherein outputting the final embedding comprises:

generating an encrypted embedded graph data structure based on the final embedding; and outputting the encrypted embedded graph data structure to a source computing device from which the encrypted graph data structure was received.

19. The computer program product of claim 11, wherein the computer readable program further causes the data processing system to:

receive a request to verify a relationship between at least two entities of the encrypted graph data structure, wherein the request comprises an encrypted tuple specifying a first entity, a second entity, and the relationship to be verified;

generate a measure of veracity of the encrypted tuple based on the final embedding and a distance function; and return an output to an originator of the request specifying the measure of veracity of the encrypted tuple.

20. An apparatus comprising:

at least one processor; and at least one memory coupled to the at least one processor, wherein the at least one memory comprises instructions which, when executed by the at least one processor, cause the at least one processor to:

receive an encrypted graph data structure comprising a plurality of encrypted entities and a plurality of encrypted predicates;

generate, for each encrypted entity in the plurality of encrypted entities, a corresponding set of entity ciphertexts based on an initial embedding of entity features of the encrypted entity;

generate, for each encrypted predicate in the plurality of encrypted predicates, a corresponding predicate ciphertext based on an initial embedding of predicate features of the encrypted predicate;

iteratively execute a machine learning process, on the sets of entity ciphertexts and the predicate ciphertexts to update embeddings of the entity features of the encrypted entities and update embeddings of predicate features of the encrypted predicates, to generate a computer model for embedding entities and predicates; and output a final embedding based on the updated embeddings of the entity features and predicate features of the computer model.

\* \* \* \* \*